(12) United States Patent
Kato et al.

(10) Patent No.: US 8,406,253 B2
(45) Date of Patent: Mar. 26, 2013

(54) INFORMATION PROCESSING APPARATUS, INFORMATION PROCESSING SYSTEM, AND PROGRAM PRODUCT

(75) Inventors: Yoshinaga Kato, Kanagawa (JP); Yukiko Sahashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 788 days.

(21) Appl. No.: 12/219,869

(22) Filed: Jul. 30, 2008

(65) Prior Publication Data

US 2009/0052348 A1    Feb. 26, 2009

(30) Foreign Application Priority Data

Jul. 30, 2007  (JP) ................. 2007-197973
Nov. 9, 2007   (JP) ................. 2007-292089
Mar. 6, 2008   (JP) ................. 2008-056074

(51) Int. Cl.
     *H04J 3/16*  (2006.01)
(52) U.S. Cl. ....... 370/466; 370/328; 370/465; 455/41.1; 709/246
(58) Field of Classification Search ................ None
     See application file for complete search history.

(56) References Cited

U.S. PATENT DOCUMENTS

| 7,941,096 | B2 * | 5/2011 | Perkins et al. | 455/41.2 |
| 8,014,722 | B2 * | 9/2011 | Abel et al. | 455/41.1 |
| 2006/0198364 | A1 * | 9/2006 | Fujii | 370/352 |
| 2006/0239236 | A1 * | 10/2006 | Otsuka | 370/338 |
| 2007/0001853 | A1 * | 1/2007 | Otranen | 340/572.1 |
| 2008/0219227 | A1 * | 9/2008 | Michaelis | 370/338 |
| 2009/0003240 | A1 * | 1/2009 | Negron et al. | 370/254 |
| 2009/0022096 | A1 * | 1/2009 | Walley et al. | 370/329 |
| 2009/0103124 | A1 | 4/2009 | Kimura et al. | |

FOREIGN PATENT DOCUMENTS

| EP | 1 048 649 A1 | 11/2000 |
| JP | 2003-110569 | 4/2003 |
| JP | 2004-080755 | 3/2004 |
| JP | 2004-200887 | 7/2004 |
| JP | 2007-006087 | 1/2007 |
| JP | 2007-79639 | 3/2007 |
| JP | 2007-087308 | 4/2007 |

OTHER PUBLICATIONS

Anonymous, "Near Field Communication White Paper," Internet Citation, Feb. 12, 2004, URL;http://www.ecma-international.org/activities/communications/2004g19-001.pdf, retrieved on Mar. 6, 2006, pp. 1-9.
European Search Report dated Mar. 17, 2011 for EP Application No. 08252558.5, pp. 1-6.
Japanese Office Action dated May 15, 2012, issued in Japanese Application No. 2008-056074.

* cited by examiner

*Primary Examiner* — Donald Mills
(74) *Attorney, Agent, or Firm* — Harness, Dickey & Pierce, P.L.C.

(57) ABSTRACT

An information processing apparatus includes two communication units having different communication areas from one another and a processing unit. When a mobile terminal is within the communication area of a first communication unit, the first communication unit receives setting information for establishing communication between the mobile terminal and a second communication unit, and function information indicating a function for processing substantial information including a document and/or an image to be communicated by the second communication unit. The second communication unit establishes communication with the mobile terminal based on the setting information received by the first communication unit, and communicates the substantial information to the mobile terminal. The processing unit processes the substantial information with the function corresponding to the function information received by the first communication unit.

13 Claims, 17 Drawing Sheets

FIG.2

| AUTHENTICATION ID | PRINTER ID | SCANNER ID |
|---|---|---|
| PERSON 1 | USAGE ALLOWED | USAGE ALLOWED |
| PERSON 2 | USAGE NOT ALLOWED | USAGE ALLOWED |
| ⋮ | ⋮ | ⋮ |

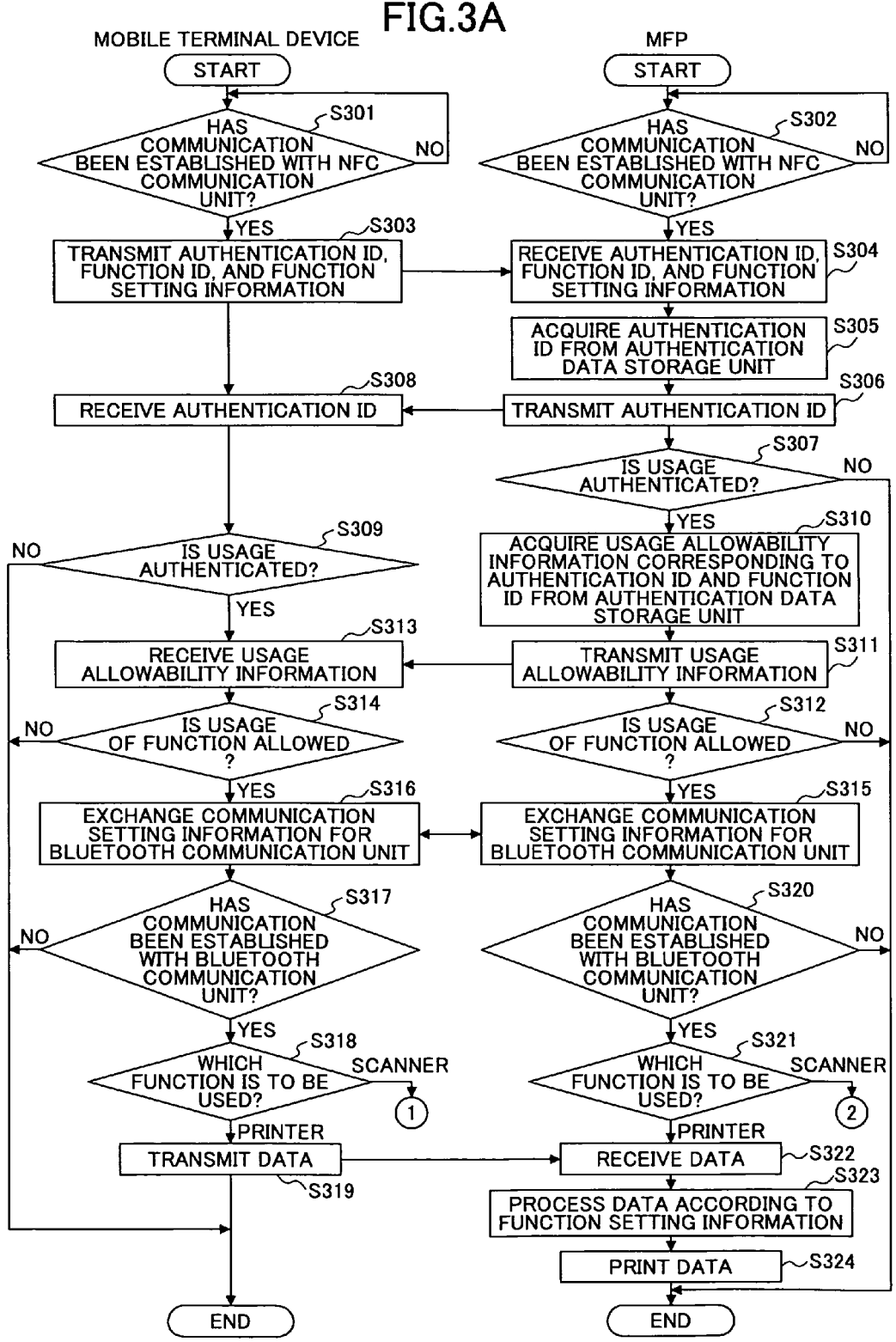

FIG.6

| FUNCTION ID | SETTING ID | CANDIDATE VALUE |
|---|---|---|
| PRINTER ID | ... | ... |
| | DOUBLE-SIDE PRINTING | ON |
| | | OFF |
| | ... | ... |
| SCANNER ID | ... | ... |
| | RESOLUTION | 300 |
| | | 400 |
| | | 600 |
| | | 1200 |
| | ... | ... |
| ... | ... | ... |
| | ... | ... |
| | ... | ... |

FIG.7

PRINTER FUNCTION

DOUBLE-SIDE PRINTING : [ON]  OFF

COMBINE : ON  [OFF]

| RECIPE NAME | RECIPE ID | FUNCTION ID | TIME | RECIPE DATA |
|---|---|---|---|---|
| A | 1 | o | 600 | DATA 1 |
| B | 2 | m | 60 | DATA 2 |
| C | 2 | m : o | 60 : 900 | DATA 3 |
| ... | ... | ... | ... | ... |

INFORMATION PROCESSING APPARATUS, INFORMATION PROCESSING SYSTEM, AND PROGRAM PRODUCT

BACKGROUND OF THE INVENTION

1. Field of the Invention

The present invention relates to an information processing apparatus, an information processing system, and a program product.

2. Description of the Related Art

The recent years have witnessed the increasing pervasiveness of the technology of connecting devices by wireless communication and transmitting/receiving data according to specifications such as Bluetooth®. Such a technology of connecting devices by wireless connection provides high convenience, because the user can freely connect devices together by wireless communication to transmit/receive data simply by bringing a device near the target device. However, in order to connect devices by wireless communication, it is necessary to make initial settings to enable the wireless communication. The settings are complicated to practically perform wireless communication, and therefore a user who is not familiar with making device settings may have difficulty.

To overcome such a problem, there is disclosed a communication system for connecting wireless devices via an intermediary terminal (see patent document 1). In such a communication system, the communication target devices are identified from among many wireless communication devices with the use of a communication unit having directivity, and communication is established between the identified devices. Accordingly, settings for wireless communication between the devices can be easily made.

Patent document 1: Japanese Laid-Open Patent Application No. 2004-200887

However, the technology described in patent document 1 requires an intermediary terminal in addition to the devices. Furthermore, various settings need to be made after the intermediary terminal has established communications between the devices, in order to transmit/receive data and to perform predetermined processes on the transmitted/received data. Thus, the user still needs to perform complicated operations for making such settings.

SUMMARY OF THE INVENTION

The present invention provides an information processing apparatus, an information processing system, and a program product in which one or more of the above-described disadvantages are eliminated.

A preferred embodiment of the present invention provides an information processing apparatus, an information processing system, and a program product in which wireless communication can be easily established, and the transmitted/received data can be easily processed.

According to one aspect of the present invention, there is provided an information processing apparatus for performing non-contact communication with a mobile terminal device, including a first communication unit corresponding to a first communication area; a second communication unit corresponding to a second communication area; and a processing unit, wherein the first communication area and the second communication area are different from one another; in the event that the mobile terminal device is present within the first communication area, the first communication unit receives from the mobile terminal device by non-contact communication, communication setting information for establishing communication between the mobile terminal device and the second communication unit, and function information indicating a function for processing substantial information including at least one of a document and an image which is to be received or transmitted by the second communication unit; the second communication unit establishes communication with the mobile terminal device based on the communication setting information received by the first communication unit, and receives from the mobile terminal device or transmits to the mobile terminal device the substantial information by non-contact communication; and the processing unit is configured to process the substantial information with the function corresponding to the function information received by the first communication unit.

According to one aspect of the present invention, there is provided an information processing system including a mobile terminal device including a first communication unit and a second communication unit having different communication areas from one another; and an information processing apparatus including a third communication unit which uses the same communication method as that of the first communication unit, a fourth communication which uses the same communication method as that of the second communication unit, and a processing unit, wherein non-contact communication is performed between the first communication unit of the mobile terminal device and the third communication unit of the information processing apparatus; non-contact communication is performed between the second communication unit of the mobile terminal device and the fourth communication unit of the information processing apparatus; in the event that the mobile terminal device is present within a communication area of the information processing apparatus, the first communication unit of the mobile terminal device transmits, to the information processing apparatus by non-contact communication, communication setting information for establishing communication between the second communication unit and the fourth communication unit, and function information indicating a process to be performed on substantial information including at least one of a document and an image which is to be received or transmitted by the second communication unit; the second communication unit of the mobile terminal device establishes communication with the information processing apparatus and receives from the information processing apparatus or transmits to the information processing apparatus the substantial information by non-contact communication; in the event that the mobile terminal device is present within a communication area of the information processing apparatus, the third communication unit of the information processing apparatus receives, from the mobile terminal device by non-contact communication, the communication setting information and the function information; the fourth communication unit of the information processing apparatus establishes communication with the mobile terminal device based on the communication setting information received by the third communication unit, and receives from the mobile terminal device or transmits to the mobile terminal device the substantial information by non-contact communication; and the processing unit is configured to process the substantial information with the function corresponding to the function information received by the third communication unit.

According to one aspect of the present invention, there is provided a program product including instructions for a mobile terminal device configured to perform non-contact communication with an information processing apparatus, the mobile terminal device including a first communication unit and a second communication unit having different communication areas from one another, the instructions causing the mobile terminal device to perform a first communication step of transmitting, to the information processing apparatus by non-contact communication with the use of the first communication unit, communication setting information for establishing communication between the information processing apparatus and the second communication unit, and function information indicating a process to be performed on substantial information including at least one of a document and an image which is to be received or transmitted by the second communication unit, the first communication step being performed in the event that the mobile terminal device is present within a communication area of the information processing apparatus; and a second communication step of establishing communication between the information processing apparatus and the second communication unit, and transmitting the substantial information to the information processing apparatus or receiving the substantial information from the information processing apparatus by non-contact communication with the use of the second communication unit.

According to one embodiment of the present invention, communication setting information for a second communication and function information for instructing a process to be performed on data are transmitted in a first communication, and therefore, the second communication can be easily established, and processes on the transmitted/received data can be easily performed.

BRIEF DESCRIPTION OF THE DRAWINGS

Other objects, features and advantages of the present invention will become more apparent from the following detailed description when read in conjunction with the accompanying drawings, in which:

FIG. 2 illustrates an example of a data configuration of an authentication data storage unit;

FIG. 3A is a flowchart illustrating wireless communication establishing process procedures and data processing procedures performed by the information processing system according to the first embodiment of the present invention;

FIG. 6 illustrates an example of a data configuration of a setting candidate data storage unit;

FIG. 7 illustrates an example of a display page displayed on an operations display unit;

FIG. 15 illustrates an example of a data configuration of a recipe information storage unit;

DETAILED DESCRIPTION OF THE PREFERRED EMBODIMENTS

A detailed description of an information processing apparatus, a route searching device, a home appliance device, an information processing system, and a program product according to a preferred embodiment of the present invention is given with reference to the accompanying drawings.

The present invention is not limited to these specific embodiments.

(First Embodiment)

A description is given, with reference to the accompanying drawings, of a first embodiment of the present invention. The present embodiment is applied to a so-called multi-function peripheral (MFP) as one example of an information processing apparatus, which includes a copy function, a fax function, a printer function, a scanner function, and a function for delivering input image data (image data scanned by the scanner function, image data formed by the printer function, and image data received by the fax function).

Figure 1:
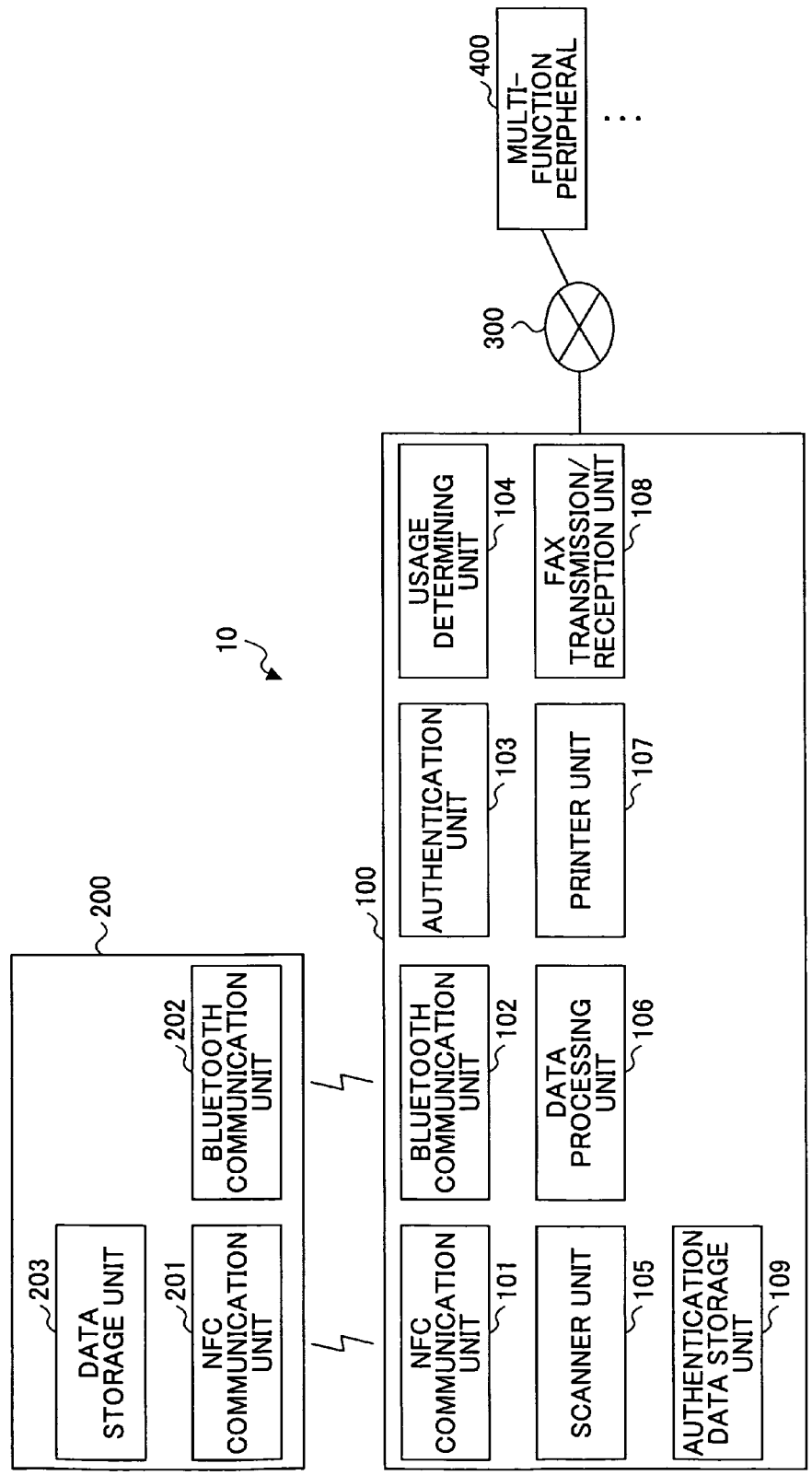
FIG. 1 is a block diagram of an information processing system according to a first embodiment of the present invention.

First, a description is given of a configuration example of an information processing system including an MFP and a mobile terminal device, to which an embodiment of the present invention is applied. FIG. 1 is a block diagram of an information processing system according to the first embodiment of the present invention. An information processing system 10 according to the present embodiment includes an MFP 100 and a mobile terminal device 200. The MFP 100 and the mobile terminal device 200 can communicate with each other with two communication units. The MFP 100 is connected to a network 300, and is connected to another MFP 400 and other fax machines and client terminal devices via the network 300.

The MFP 100 includes an NFC communication unit 101, a Bluetooth communication unit 102, an authentication unit 103, a usage allowability determining unit 104, a scanner unit 105, a data processing unit 106, a printer unit 107, a fax transmission/reception unit 108, and an authentication data storage unit 109.

The NFC communication unit 101 includes a non-contact IC, and performs bidirectional communications with the mobile terminal device 200 in a non-contact manner according to a wireless communication specification referred to as Near Field Communication (NFC). Specifically, the NFC communication unit 101 has a function of a reader/writer or a tag with a built-in communication control program for reading information from an NFC communication unit 201 of the mobile terminal device 200 in a non-contact manner. The NFC communication unit 101 transmits/receives data by non-contact wireless communication for a communication distance (zero through several tens cm) which is a shorter communication distance than that of the other communication unit, i.e., the Bluetooth communication unit 102. Furthermore, in the non-contact communication according to the NFC specification performed by the NFC communication unit 101, the data transfer speed (100 kbps through 400 kbps) is slower than the data transfer speed (1 Mbps through 2 Mbps) of wireless communication according to the Bluetooth® specification performed by the Bluetooth communication unit 102, and therefore the NFC communication unit 101 is used for data communication of a relatively small volume. The communication specification of the NFC communication unit 101 is not limited to NFC; another communication specification can be employed, such as IrDA (Infrared Data Association), as long as wireless communication is performed for a relatively short distance, i.e., for a shorter communication range than that of the wireless communication according to the Bluetooth® specification described below. The NFC communication unit 101 corresponds to the first communication unit according to an embodiment of the present invention.

In the event that the mobile terminal device 200 is present in the communication area of the NFC communication unit 101, the NFC communication unit 101 establishes communication with the NFC communication unit 201 of the mobile terminal device 200 by the same communication protocol as that of the NFC communication unit 201 of the mobile terminal device 200. Then, the NFC communication unit 101 receives an authentication ID, a function ID, communication setting information, and function setting information transmitted from the mobile terminal device 200. An authentication ID is information (authentication information according to an embodiment of the present information) for determining whether usage of the MFP 100 is authorized, in response to an instruction from the mobile terminal device 200. The authentication ID can be unique information assigned to the mobile terminal device 200, or information for identifying the user holding the mobile terminal device 200. For example, an employee ID can be used as information for identifying the user. A function ID is information (function information according to an embodiment of the present information) indicating a function of the MFP 100 which the mobile terminal device 200 is requesting to use. For example, to use a printer function of the MFP 100, "printer ID" is set as the function ID. To use a scanner function of the MFP 100, "scanner ID" is set as the function ID.

Communication setting information is initial setting information required for performing wireless communication with the Bluetooth communication unit 102. As described above, the communication setting information for Bluetooth communication is transmitted between the mobile terminal device 200 and the MFP 100 by the NFC communication method, with which data transmission/reception can be easily performed. Accordingly, the user can specify the MFP 100 for performing Bluetooth communication, simply by bringing the mobile terminal device 200 near the target MFP 100 without the need of special operations, thus enhancing convenience for the user. The function setting information is setting information indicating the process contents according to the function. For example, when a printer ID is set as the function ID, a setting value "on" or "off" is set for the setting ID of "double-side printing", and a setting value "on" or "off" is set for the setting ID of "combining" (combining plural originals onto one page), which correspond to print setting information as the function setting information. When a scanning ID is set as the function ID, a setting value of "300" dpi is set for the setting ID of "resolution", which corresponds to scanning setting information as the function setting information.

The authentication unit 103 determines whether the authentication ID transmitted by the mobile terminal device 200 is an ID that is authorized to use the MFP 100. Specifically, the authentication is performed by determining whether the authentication ID received by the NFC communication unit 101 corresponds to the authentication ID stored in the authentication data storage unit 109.

The usage allowability determining unit 104 determines whether the function ID transmitted by the mobile terminal device 200 is authorized to use the MFP 100. Specifically, the usage allowability determining unit 104 acquires usage allowance information corresponding to the authentication ID and the function ID received by the NFC communication unit 101 from the authentication data storage unit 109, and determines whether the acquired usage allowance information includes a setting indicating that usage is allowed.

The Bluetooth communication unit 102 communicates with the mobile terminal device 200 in a non-contact manner according to the Bluetooth® specification. The Bluetooth communication unit 102 which employs the wireless communication method according to the Bluetooth® specification performs transmission/reception of data of higher volume and at higher speed (1 Mbps through 10 Mbps), compared to the NFC communication unit 101 employing the non-contact communication method according to the NFC specification. Furthermore, the Bluetooth communication unit 102 employing the wireless communication method according to the Bluetooth® specification can be used even when there is an obstacle as long as the distance between devices is less than or equal to 10 meters, and therefore the communication area is larger than that of the communication method according to the NFC specification.

Specifically, the Bluetooth communication unit 102 includes a Bluetooth® I/F (interface) such as a transceiver according to the Bluetooth® specification for transmitting/receiving data, and a communication control unit. The Bluetooth® I/F is for transmitting/receiving data between the mobile terminal device 200 with which the MFP 100 is (wirelessly) connected. The communication control unit is a communication control program for performing a process of establishing wireless communication according to the Bluetooth® specification by exchanging communication setting information with the communication destination via the Bluetooth® I/F, before performing transmission/reception of data with the mobile terminal device 200. Address information that is uniquely assigned to the Bluetooth® I/F is used as the communication setting information.

In the present embodiment, the Bluetooth communication unit 102 complying with the Bluetooth® specification is used for performing wireless communication; however, the specification is not limited thereto. For example, to perform wireless communication by a method according to the so-called wireless LAN specification, other specifications can be used instead of the Bluetooth® specification, such as IEEE 802.11a, IEEE 802.11b, IEEE 802.11n, and IEEE 802.11g. In this case, the wireless LAN communication unit is to include a network board according to the IEEE 802.11a/IEEE 802.11b specification for performing transmission/reception of data, and a communication control unit (communication control program) for controlling establishment of wireless communication and transmission/reception of data according to the IEEE 802.11a/IEEE 802.11b specification. Furthermore, in the UWB (Ultra Wide Band) communication method, if the distance between devices is less than or equal to three meters, the wireless communication can be performed according to the Wireless USB specification by which communication can be performed at 480 Mbps, which is equal to wired communication of USB 2.0. In this case, a Wireless USB communication unit is to include a UWB device according to the Wireless USB specification for performing transmission/reception of data and a communication control unit (communication control program) for controlling the establishment of wireless communication and transmission/reception of data.

Furthermore, when communication setting information is received from the mobile terminal device 200 by NFC communication and Bluetooth communication is established between the MFP 100 and the mobile terminal device 200 based on the received communication setting information, the Bluetooth communication unit 102 receives/transmits data corresponding to the function ID. The transmitted/received data can be any one of image data, document data, text data, or any other type of data.

The scanner unit 105 reads originals with an image pickup device such as a CCD (Charge Coupled Device). The scanner unit 105 can include an ADF (AutoDocument Feeder) to provide an automatic document feeding function.

The data processing unit 106 performs a process on data received by the Bluetooth communication unit 102 or data to be transmitted by the Bluetooth communication unit 102, which process is performed in accordance with the function ID and the function setting conditions received by the NFC communication unit 101. For example, when the function ID is a "printer ID", the data processing unit 106 performs the following processes on the data in accordance with the function setting information: an image processing operation such as adjusting the density and color, or a layout processing operation such as single-side/double-side printing. Furthermore, when the function ID is a "scanner ID", the data processing unit 106 performs, on the data read by the scanner unit 105, image processing operations and layout processing operations in accordance with the function setting conditions.

The printer unit 107 prints the data that have undergone the image processing operations and layout processing operations performed by the data processing unit 106.

The fax transmission/reception unit 108 transmits data that have been read by the scanner unit 105 or data that have been transmitted from the mobile terminal device 200 to the other MFP 400, another fax machine, or another client terminal device, via the network 300.

The authentication data storage unit 109 stores authentication data for determining whether usage of the MFP 100 or a function of the MFP 100 is authorized. FIG. 2 illustrates an example of a data configuration of the authentication data storage unit. The authentication data storage unit 109 stores the authentication IDs in association with usage allowance information for each of the function IDs. As shown in FIG. 2, a user corresponding to the authentication ID "person1" can use both the printer function and the scanner function of the MFP 100. A user corresponding to the authentication ID "person2" can use the scanner function of the MFP 100 but not the printer function of the MFP 100.

Next, a description is given of the mobile terminal device 200. The mobile terminal device 200 includes the NFC communication unit 201, a Bluetooth communication unit 202, and a data storage unit 203. Specifically, the mobile terminal device 200 is, for example, a mobile phone, a PDA (Personal Digital Assistant), a notebook computer, or a portable information storage medium.

When the mobile terminal device 200 is present in the communication area of the NFC communication unit 101 of the MFP 100, the NFC communication unit 201 establishes communication between the mobile terminal device 200 and the NFC communication unit 101 of the MFP 100 by the same communication protocol as that of the communication control program of the NFC communication unit 101 of the MFP 100, and transmits an authentication ID and a function ID for the mobile terminal device 200 to use the MFP 100 as well as communication setting information and function setting information for establishing communication to be performed by the Bluetooth communication unit 202.

Specifically, the NFC communication unit 201 is an NFC chip with a built-in tag and a built-in communication control program. The communication control program is for establishing communication and controlling transmission/reception of data. The tag stores the authentication ID and the function ID. When the NFC communication unit 201 comes near the MFP 100 and the NFC communication unit 201 is present in the communication area of the MFP 100, communication is established, and as the NFC communication unit 101 (reader/writer) of the MFP 100 reads the information in the tag of the NFC communication unit 201, the information in the tag is transmitted to the NFC communication unit 101.

It is also possible to install, in a non-contact method IC card, an NFC chip including a built-in tag and a built-in communication control program. In this case, the NFC chip is provided separately from the body of the mobile terminal device 200, and transmits the authentication ID and the function ID to the MFP 100.

In the present embodiment, a tag storing the authentication ID and the function ID is provided in the NFC communication unit 201 of the mobile terminal device 200, and the NFC communication unit 101 of the MFP 100 functions as the reader/writer; however, the present invention is not limited thereto. The NFC communication unit 201 of the mobile terminal device 200 can function as the reader/writer, and the NFC communication unit 101 of the MFP 100 can function as the tag. In this case, the information processing system 10 will have the following configuration. The authentication ID and the function ID are stored in the NFC communication unit 101 of the MFP 100. Communication is established by bringing the NFC communication unit 201 of the mobile terminal device 200 near the NFC communication unit 101. A control unit (not shown) transfers the authentication ID and the function ID in the NFC communication unit 101 to the NFC communication unit 201. A control unit of the mobile terminal device 200 processes the authentication ID and function ID transferred to the reader/writer of the NFC communication unit 201. Furthermore, each of the NFC communication unit 201 of the mobile terminal device 200 and the NFC communication unit 101 of the MFP 100 can be provided with functions of both a tag and a reader/writer.

When communications are established between the Bluetooth communication unit 202 and the Bluetooth communication unit 102 of the MFP 100 by the same communication protocol as that of the communication control program of the Bluetooth communication unit 102 of the MFP 100, the Bluetooth communication unit 202 transmits the data stored in the data storage unit 203 to the MFP 100. Furthermore, the Bluetooth communication unit 202 receives data that have been processed with the use of a function of the MFP 100.

The data storage unit 203 stores data for using a function of the MFP 100. For example, when the printer function of the MFP 100 is to be used, communication setting information, print setting information as the function setting information, and image data are stored in the data storage unit 203. The function setting information is stored in a data format of, for example, "setting ID: setting value". The setting ID is information for indicating the process contents of a function. For example, in the case of a printer function, the setting ID may be "double-side printing". The setting value is set as a process on the data, from among candidate values that can be set for the setting ID. For example, a setting value "on" may be set for a setting ID "double-side printing".

Figure 3B:
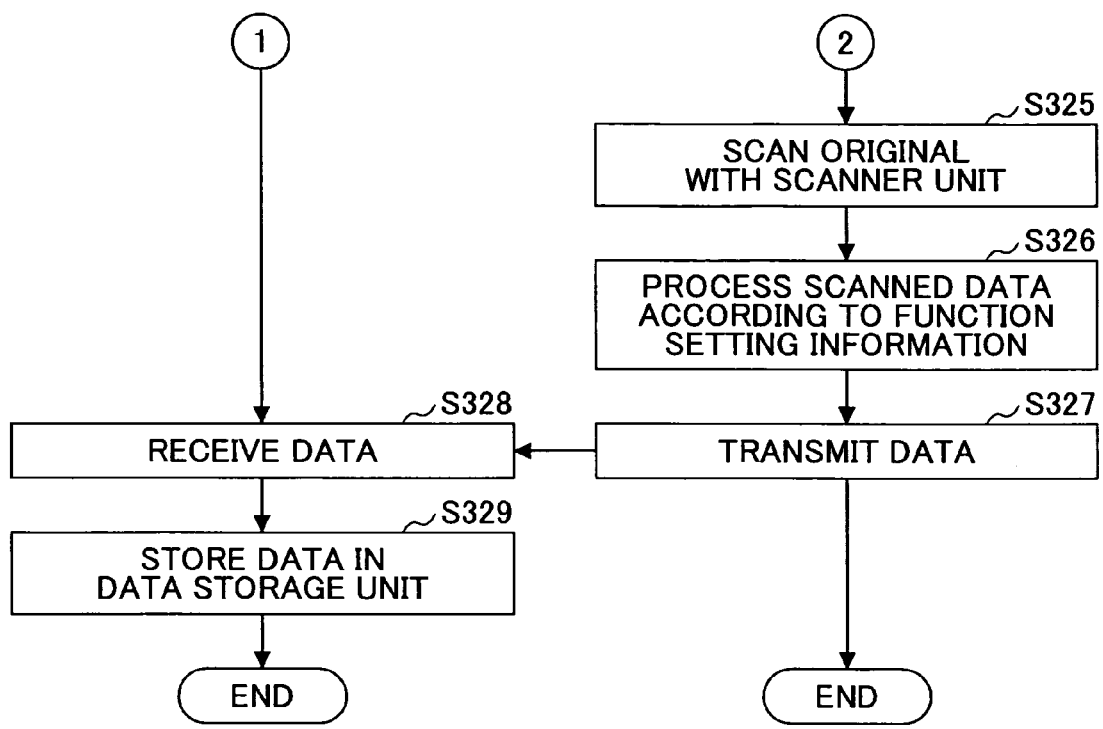
FIG. 3B is a flowchart illustrating wireless communication establishing process procedures and data processing procedures performed by the information processing system according to the first embodiment of the present invention.

Next, a description is given of establishment of wireless communication and data processing performed by the information processing system 10 including the MFP 100 and the mobile terminal device 200 having the above configuration. FIGS. 3A and 3B are flowcharts illustrating the wireless communication establishing process procedures and the data processing procedures performed by the information processing system 10.

First, in the mobile terminal device 200, the NFC communication unit 201 determines whether communication has been established with the NFC communication unit 101 of the MFP 100 (step S301). When the NFC communication unit 201 determines that communication has not been established with the NFC communication unit 101 of the MFP 100, i.e., the mobile terminal device 200 is not present in the communication area (No in step S301), the process control returns to step S301, and step S301 is repeated until communication is established with the NFC communication unit 101 of the MFP 100.

Similarly, in the MFP 100, the NFC communication unit 101 determines whether communication has been established with the NFC communication unit 201 of the mobile terminal device 200 (step S302). When the NFC communication unit 101 determines that communication has not been established with the NFC communication unit 201 of the mobile terminal device 200, i.e., the mobile terminal device 200 is not present in the communication area (No in step S302), the process control returns to step S302, and step S302 is repeated until communication is established with the NFC communication unit 201 of the mobile terminal device 200.

Next, when the NFC communication unit 201 determines that communication has been established with the NFC communication unit 101 of the MFP 100, i.e., the mobile terminal device 200 is present in the communication area of the MFP 100 (Yes in step S301), the NFC communication unit 201 transmits an authentication ID, a function ID, and function setting information to the NFC communication unit 101 of the MFP 100 (step S303). When the mobile terminal device 200 is present in the communication area, it means that the user is holding the NFC communication unit 201 of the mobile terminal device 200 to touch the NFC communication unit 101 of the MFP 100. Accordingly, an instruction is reliably given to the MFP 100 which the user desires to use.

In the MFP 100, when the NFC communication unit 101 determines that communication has been established with the NFC communication unit 201 of the mobile terminal device 200, i.e., the mobile terminal device 200 is present in the communication area (Yes in step S302), the NFC communication unit 101 receives the authentication ID, the function ID, and the function setting information transmitted from the NFC communication unit 201 of the mobile terminal device 200 (step S304). The authentication unit 103 acquires an authentication ID from the authentication data storage unit 109 (step S305). The NFC communication unit 101 transmits, to the mobile terminal device 200, the authentication ID acquired from the authentication data storage unit 109 (step S306). The authentication unit 103 cross-checks the authentication ID acquired from the authentication data storage unit 109 with the authentication ID transmitted from the mobile terminal device 200 to determine whether to authenticate usage of the MFP 100 (step S307). When the authentication unit 103 determines not to authenticate usage of the MFP 100, i.e., the received authentication ID is not stored in the authentication data storage unit 109 (No in step S307), the process ends.

In the mobile terminal device 200, the NFC communication unit 201 receives the authentication ID transmitted from the MFP 100 (step S308). The NFC communication unit 201 determines whether to authenticate usage of the MFP 100 with the received authentication ID (step S309). When the NFC communication unit 201 determines to authenticate usage of the MFP 100 based on the received authentication ID (Yes in step S309), the process continues. When the NFC communication unit 201 determines not to authenticate usage of the MFP 100 based on the received authentication ID (No in step S309), the process ends.

In the MFP 100, when the authentication unit 103 determines to authenticate usage of the MFP 100, i.e., the received authentication ID is stored in the authentication data storage unit 109 (Yes in step S307), the usage allowability determining unit 104 acquires, from the authentication data storage unit 109, usage allowability information corresponding to the authentication ID and the function ID received from the mobile terminal device 200 (step S310). The NFC communication unit 101 transmits, to the mobile terminal device 200, the usage allowability information acquired from the authentication data storage unit 109 (step S311). The usage allowability determining unit 104 determines whether the function specified in the acquired usage allowability information can be used (step S312). When the usage allowability determining unit 104 determines that the specified function cannot be used (No in step S312), the process ends.

In the mobile terminal device 200, the NFC communication unit 201 receives the usage allowability information transmitted from the MFP 100 (step S313). The NFC communication unit 201 determines whether the function of the MFP 100 can be used based on the received usage allowability information (step S314). When the NFC communication unit 201 determines that the function of the MFP 100 can be used (Yes in step S314), the process continues. When the NFC communication unit 201 determines that the function of the MFP 100 cannot be used (No in step S314), the process ends.

In the MFP 100, when the usage allowability determining unit 104 determines that the specified function can be used (Yes in step S312), the NFC communication unit 101 exchanges communication setting information with the mobile terminal device 200 (steps S315 and S316). Specifically, the NFC communication unit 101 of the MFP 100 requests the mobile terminal device 200 to transmit communication setting information. Then, the NFC communication unit 201 of the mobile terminal device 200 transmits communication setting information for Bluetooth communication. The communication setting information for Bluetooth communication can be transmitted in steps S303 and S304, together with the authentication ID, the function ID, and the function setting information.

In the mobile terminal device 200, the Bluetooth communication unit 202 determines whether communication has been established with the Bluetooth communication unit 102 of the MFP 100 (step S317). When the Bluetooth communication unit 202 determines that communication has not been established with the Bluetooth communication unit 102 of the MFP 100 (No in step S317), the process ends. When the Bluetooth communication unit 202 determines that communication has been established with the Bluetooth communication unit 102 of the MFP 100 (Yes in step S317), the Bluetooth communication unit 202 determines which function is to be used (step S318). When the Bluetooth communication unit 202 determines that the function to be used is the printer ("printer" in step S318), the Bluetooth communication unit 202 transmits the data stored in the data storage unit 203 to the MFP 100 (step S319).

Meanwhile, in the MFP 100, the Bluetooth communication unit 102 determines whether communication has been established with the Bluetooth communication unit 202 of the mobile terminal device 200 (step S320). When the Bluetooth communication unit 102 determines that communication has not been established with the Bluetooth communication unit 202 of the mobile terminal device 200 (No in step S320), the process ends.

When the Bluetooth communication unit 102 determines that communication has been established with the Bluetooth communication unit 202 of the mobile terminal device 200 (Yes in step S320), the usage allowability determining unit 104 determines which function is to be used (step S321). When the usage allowability determining unit 104 determines that the function to be used is the printer, i.e., the function ID is the printer ID ("printer" in step S321) the Bluetooth communication unit 102 receives the data transmitted by the mobile terminal device 200 (step S322). The data received at this step are the data before being processed according to the print setting information. When the mobile terminal device 200 is provided with a data processing function, the Bluetooth communication unit 102 can receive the processed data and print the received data. Furthermore, the mobile terminal device 200 can perform a data processing operation corresponding to one part of the print setting information, and the MFP 100 can perform the remaining data processing operations according to the print setting information transmitted from the mobile terminal device 200. The data processing unit 106 processes the received data according to the print setting information for performing the printing operation (step S323). Furthermore, the print setting information can be set at a printer driver, or the print setting information can be embedded in data in a description language format such as PDF (Portable Document Format) and PostScript. The printer unit 107 prints the processed data (step S324).

In step S321, when the usage allowability determining unit 104 determines that the function to be used is the scanner, i.e., the function ID is a scanner ID ("scanner" in step S321), the scanner unit 105 scans an original (step S325). The data processing unit 106 processes the scanned data according to the scanner setting information (step S326). The Bluetooth communication unit 102 transmits the processed data to the mobile terminal device 200 (step S327).

In the mobile terminal device 200, the Bluetooth communication unit 202 receives the data transmitted from the Bluetooth communication unit 102 of the MFP 100 (step S328). The Bluetooth communication unit 202 stores the received data in the data storage unit 203 (step S329).

As described above, the mobile terminal device 200 and the MFP 100 transmits, by NFC communication, communication setting information necessary for Bluetooth communication, and use the transmitted communication setting information to establish Bluetooth communication. Therefore, communication with the MFP 100 can be easily performed simply by bringing the mobile terminal device 200 near the MFP 100. Furthermore, instructions for using a function of the MFP 100 can be transmitted from the mobile terminal device 200 by NFC communication, and therefore the function of the MFP 100 can be used without having to operate the MFP 100 for data transmission/reception and making settings for the data. Accordingly, the user's workload can be reduced.

In the present embodiment, the printer function and the scanner function are taken as examples of functions of the MFP 100 to be used. Other than these, a fax function of the MFP 100 can be used. For example, in the case of using the fax function, the data stored in the data storage unit 203 of the mobile terminal device 200 are transmitted to the MFP 100, and the data can be transmitted to the other MFP 400 or another fax machine according to the function setting information.

Furthermore, it is possible to transmit only the function setting information from the mobile terminal device 200 to the MFP 100, scan an original with the scanner unit 105 of the MFP 100, perform a data processing operation on the scanned data according to the function setting information, and transmit the processed data to the other MFP 400 or another fax machine.

Furthermore, when the copy function is to be used, a copy ID and copy setting information stored as an authentication ID and a function ID in the data storage unit 203 of the mobile terminal device 200 are transmitted to the MFP 100. Accordingly, an original is scanned by the scanner unit 105, data processing is performed on the scanned data according to copy setting information, and the processed data are printed by the printer unit 107.

Figure 4:
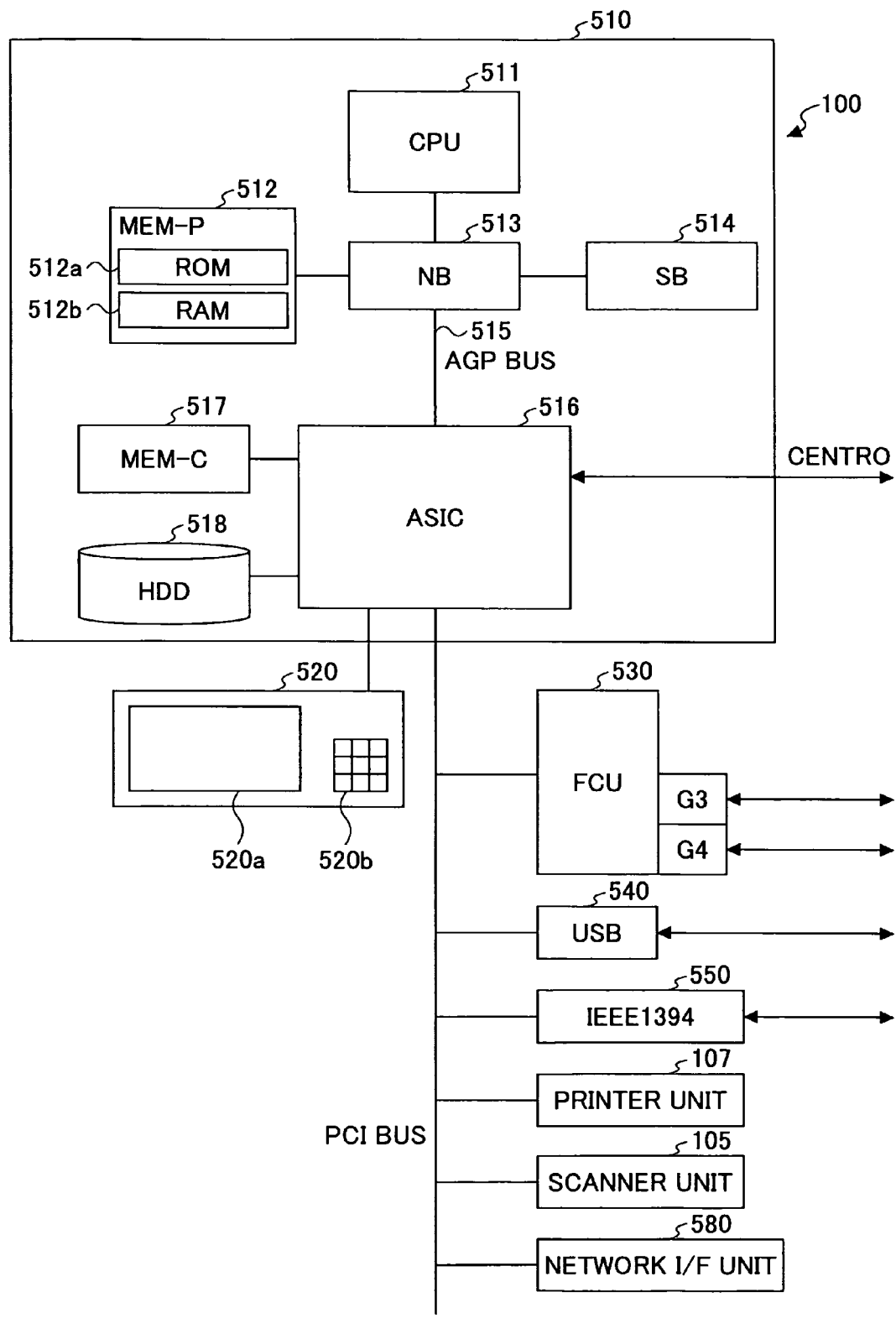
FIG. 4 is a block diagram of a hardware configuration of a multi-function peripheral according to the first embodiment of the present invention.

Next, a description is given of the hardware configuration of the MFP 100. FIG. 4 is a block diagram of the hardware configuration of the MFP 100 according to the present embodiment. As shown in FIG. 4, the MFP 100 includes a controller 510, the printer unit 107, and the scanner unit 105, which are interconnected by PCI (Peripheral Component Interconnect). The controller 510 controls the entire MFP 100, the rendering operations, communications, and input from an operations unit 520. The printer unit 107 and the scanner unit 105 include image processing parts such as error diffusion for performing binarization and gamma conversion for correcting the gradation. The operations unit 520 includes an operations display unit 520a used for displaying, on an LCD (Liquid Crystal Display), original image information obtained by scanning an original with the scanner unit 105, and receiving input from the operator via a touch panel; and a keyboard unit 520b for receiving key input from the operator.

Functions of the MFP 100 according to an embodiment of the present invention can be switched by application switch keys of the operations unit 520, to select a document box function, a copier function, a printer function, or a fax function. When the document box function is selected, the MFP 100 is in a document box mode. When the copier function is selected, the MFP 100 is in a copy mode. When the printer function is selected, the MFP 100 is in a printer mode. When the fax function is selected, the MFP 100 is in a fax mode.

The controller 510 includes a CPU (Central Processing Unit) 511 which is the main part of the computer, a system memory (MEM-P) 512, a north bridge (NB) 513, a south bridge (SB) 514, an ASIC (Application Specific Integrated Circuit) 516, a local memory (MEM-C) 517 which is a storage unit, a hard disk drive (HDD) 518 which is a storage unit, and an AGP (Accelerated Graphics Port) bus 515 connecting the NB 513 and the ASIC 516. Furthermore, the MEM-P 512 includes a ROM (Read Only Memory) 512a and a RAM (Random Access Memory) 512b.

The CPU 511 controls the entire MFP 100, and includes a chip set including the NB 513, the MEM-P 512, and the SB 514. The CPU 511 is connected to other devices via the chip set.

The NB 513 is for interconnecting the CPU 511, the MEM-P 512, the SB 514, and the AGP bus 515. The NB 513 includes a memory controller for controlling operations of reading from/writing in the MEM-P 512, a PCI master, and an AGP target.

The MEM-P 512 is a system memory used for holding programs and data, for loading programs and data, and for rendering operations performed by the printer. The MEM-P 512 includes the ROM 512a and the RAM 512b. The ROM 512a is a read-only memory used for storing programs and data for controlling operations of the CPU 511. The RAM 512b is a read-write memory used for loading programs and data and for rendering operations performed by the printer.

The SB 514 is for interconnecting the NB 513, the PCI devices, and peripheral devices. The SB 514 is connected to the NB 513 via the PCI bus. A network interface (I/F) unit 580 is also connected to the PCI bus.

The ASIC 516 is an IC (Integrated Circuit) to be used for image processing, which includes hardware elements for image processing. The ASIC 516 functions as a bridge for connecting the AGP bus 515, the PCI bus, the HDD 518, and the MEM-C 517. The ASIC 516 includes a PCI target, an AGP master, an arbiter (ARB) which is a central element of the ASIC 516, a memory controller for controlling the MEM-C 517, plural DMACs (Direct Memory Access Controller) for rotating image data according to hardware logic, and a PCI unit for transferring data via the PCI bus between the printer unit 107 and the scanner unit 105. A FCU (Fax Control Unit) 530, a USB (Universal Serial Bus) 540, and an IEEE 1394 (the Institute of Electrical and Electronics Engineers 1394) interface 550 are connected to the ASIC 516 via the PCI bus.

The MEM-C 517 is a local memory to be used as a copy image buffer and a code buffer. The HDD 518 is a storage unit for accumulating image data, programs for controlling operations of the CPU 511, font data, and forms.

The AGP bus 515 is a bus interface for a graphics accelerator card proposed for increasing the speed of graphic processes. By directly accessing the MEM-P 512 with high throughput, the speed of the graphics accelerator card is increased.

The program executed by the MFP 100 according to the present embodiment is provided in a ROM. The program executed by the MFP 100 according to the present embodiment can be recorded as a file having an installable format or an executable format in a computer-readable recording medium such as a CD-ROM, a flexible disk (FD), a CD-R, or a DVD (Digital Versatile Disk).

Furthermore, the program executed by the MFP 100 according to the present embodiment can be stored in a computer connected to a network such as the Internet, so that the program can be provided by being downloaded via the network. Moreover, the program executed by the MFP 100 according to the present embodiment can be provided or distributed via a network such as the Internet.

The program executed by the MFP 100 according to the present embodiment has a configuration of a module including the above units (NFC communication unit, Bluetooth communication unit, authentication unit, usage allowability determining unit, data processing unit, fax transmission/reception unit, etc.). As to the actual hardware, the CPU (processor) reads a program from the ROM and executes the program so that the above-described units are loaded in a main memory, and the NFC communication unit, the Bluetooth communication unit, the authentication unit, the usage allowability determining unit, the data processing unit, the fax transmission/reception unit, etc., are generated in the main memory.

The program executed by the mobile terminal device 200 according to the present embodiment is provided by being installed beforehand in a ROM, etc. The program executed by the mobile terminal device 200 according to the present embodiment can be provided by being recorded in a computer-readable recording medium such as a CD-ROM, a flexible disk, a CDR, and a DVD in a file of an installable format or an executable format.

Furthermore, the program executed by the mobile terminal device 200 according to the present embodiment can be stored in a computer connected to a network such as the Internet, so that the program can be provided by being downloaded via the network. Moreover, the program executed by the mobile terminal device 200 according to the present embodiment can be provided or distributed via a network such as the Internet.

The program executed by the mobile terminal device 200 according to the present embodiment has a configuration of a module including the above units (NFC communication unit, Bluetooth communication unit, etc.). As to the actual hardware, the CPU (processor) reads a program from the ROM and executes the program so that the above-described units are loaded in the main memory, and the NFC communication unit, the Bluetooth communication unit, etc., are generated in the main memory.

In the above embodiment, an MFP is taken as one example; however, the present invention is not limited to an MFP. The present invention can be applied to various devices such as a copier, a fax machine, and a printer.

(Second Embodiment)

Figure 5:
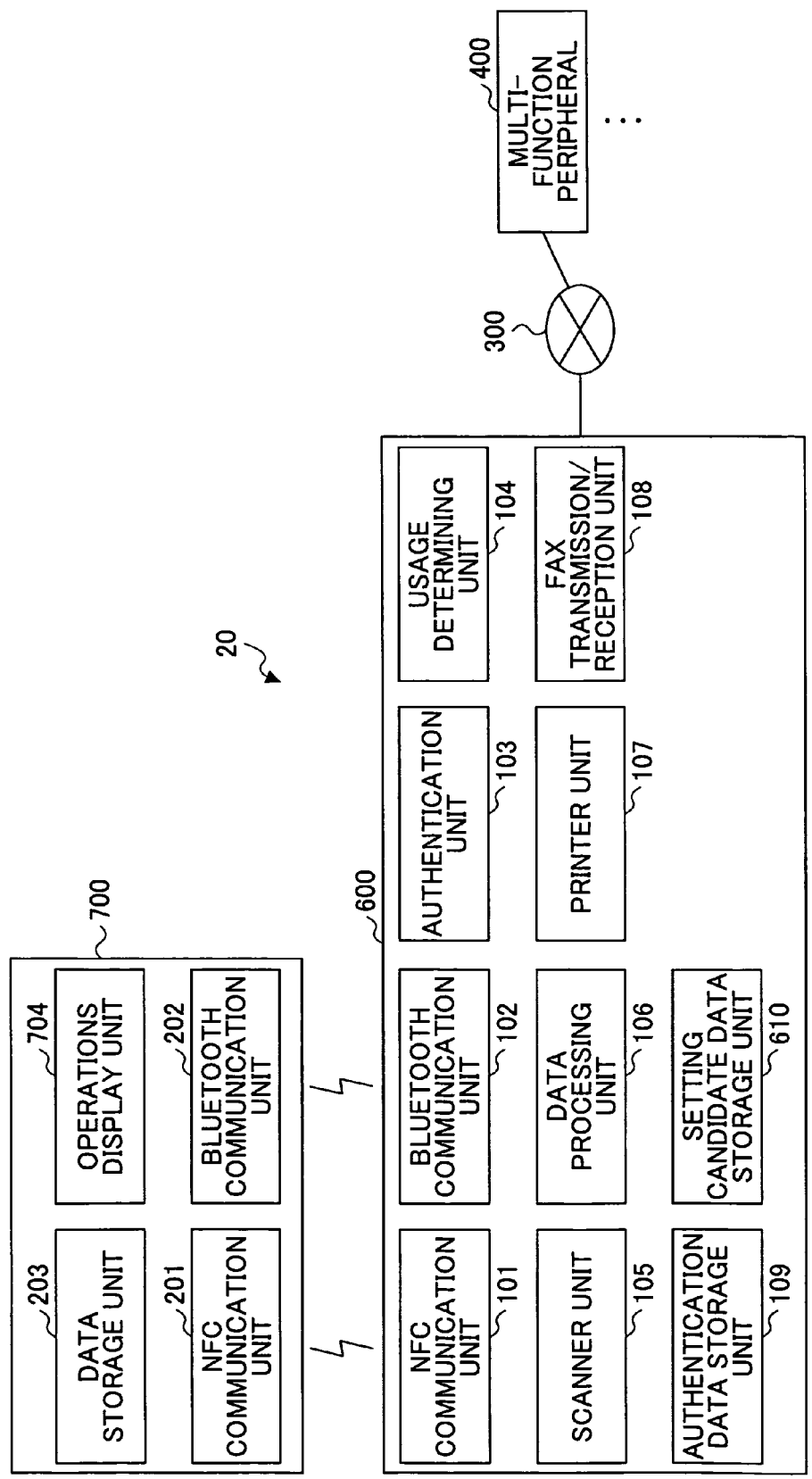
FIG. 5 is a block diagram of an information processing system according to a second embodiment of the present invention.

A description is given, with reference to the accompanying drawings, of a second embodiment of the present invention. A description is given of an example of a configuration of the MFP and the mobile terminal device to which the present invention is applied, for elements that are different from those of the first embodiment. The other elements are the same as those of the first embodiment, so reference is to be made to the above description, and no further descriptions are given. FIG. 5 is a block diagram of an information processing system 20 according to the second embodiment.

An MFP 600 includes the NFC communication unit 101, the Bluetooth communication unit 102, the authentication unit 103, the usage allowability determining unit 104, the scanner unit 105, the data processing unit 106, the printer unit 107, the fax transmission/reception unit 108, the authentication data storage unit 109, and a setting candidate data storage unit 610. The configurations and functions of the NFC communication unit 101, the Bluetooth communication unit 102, the authentication unit 103, the usage allowability determining unit 104, the scanner unit 105, the data processing unit 106, the printer unit 107, the fax transmission/reception unit 108, and the authentication data storage unit 109 are substantially the same as those of the first embodiment, and are thus not further described.

The setting candidate data storage unit 610 stores setting candidate information indicating process contents that can be set for each of the functions of the MFP 600. FIG. 6 illustrates an example of a data configuration of the setting candidate data storage unit. The setting candidate data storage unit 610 stores the function IDs, the setting IDs, and the candidate values in association with each other. In general, the process contents of each function of the MFP 600 differ according to the machine type, and therefore the setting ID for each function ID and candidate values that can be set for each setting ID are stored.

Next, a description is given of a mobile terminal device 700. The mobile terminal device 700 includes the NFC communication unit 201, the Bluetooth communication unit 202, the data storage unit 203, and an operations display unit 704. The configurations and functions of the NFC communication unit 201, the Bluetooth communication unit 202, and the data storage unit 203 are the same as those of the first embodiment, and are thus not further described.

The operations display unit 704 displays setting IDs and candidate values corresponding to a function ID received from the MFP 600, and receives input of a setting value selected from among the setting values corresponding to the displayed setting ID. FIG. 7 illustrates an example of a display page displayed on the operations display unit 704. As shown in FIG. 7, "double-side printing" and "combining" are displayed as settings IDs of the printer function, and candidate values are displayed for each of the setting IDs. Furthermore, the selected candidate value and the selected setting value are surrounded by frames in the operations display unit 704.

Figure 8:
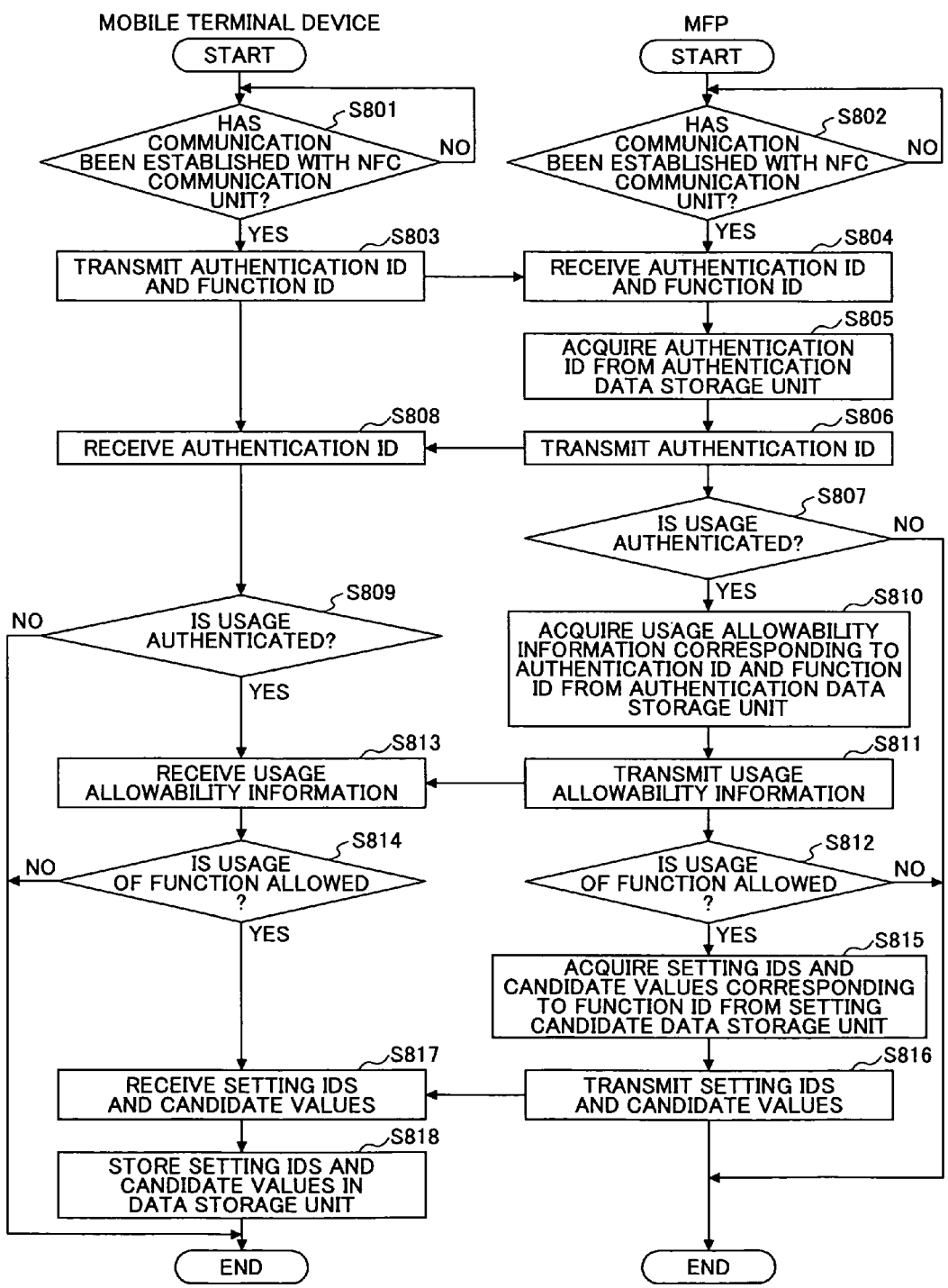
FIG. 8 is a flowchart illustrating wireless communication establishing process procedures and setting candidate data transmission process procedures performed by the information processing system according to the second embodiment of the present invention.

Next, a description is given of establishment of wireless communication and a setting candidate data transmission process performed by the information processing system 20 including the MFP 600 and the mobile terminal device 700 having the above configuration. FIG. 8 is a flowchart illustrating the wireless communication establishing process procedures and the setting candidate data transmission process procedures performed by the information processing system 20.

First, in the mobile terminal device 700, the NFC communication unit 201 determines whether communication has been established with the NFC communication unit 101 of the MFP 600 (step S801). When the NFC communication unit 201 determines that communication has not been established with the NFC communication unit 101 of the MFP 600, i.e., the mobile terminal device 700 is not present in the communication area (No in step S801), the process control returns to step S801, and step S801 is repeated until communication is established with the NFC communication unit 101 of the MFP 600.

Similarly, in the MFP 600, the NFC communication unit 101 determines whether communication has been established with the NFC communication unit 201 of the mobile terminal device 700 (step S802). When the NFC communication unit 101 determines that communication has not been established with the NFC communication unit 201 of the mobile terminal device 700, i.e., the mobile terminal device 700 is not present in the communication area (No in step S802), the process control returns to step S802, and step S802 is repeated until communication is established with the NFC communication unit 201 of the mobile terminal device 700.

Next, when the NFC communication unit 201 determines that communications have been established with the NFC communication unit 101 of the MFP 600, i.e., the mobile terminal device 700 is present in the communication area (Yes in step S801), the NFC communication unit 201 transmits an authentication ID and a function ID to the NFC communication unit 101 of the MFP 600 (step S803).

In the MFP 600, when the NFC communication unit 101 determines that communication has been established with the NFC communication unit 201 of the mobile terminal device 700, i.e., the mobile terminal device 700 is present in the communication area (Yes in step S802), the NFC communication unit 101 receives the authentication ID and the function ID transmitted from the NFC communication unit 201 of the mobile terminal device 700 (step S804). The authentication unit 103 acquires an authentication ID from the authentication data storage unit 109 (step S805). The NFC communication unit 101 transmits, to the mobile terminal device 700, the authentication ID acquired from the authentication data storage unit 109 (step S806). The authentication unit 103 cross-checks the authentication ID acquired from the authentication data storage unit 109 with the authentication ID transmitted from the mobile terminal device 700 to determine whether to authenticate usage of the MFP 600 (step S807). When the authentication unit 103 determines not to authenticate usage of the MFP 600, i.e., when the authentication unit 103 determines that the received authentication ID is not stored in the authentication data storage unit 109 (No in step S807), the process ends.

In the mobile terminal device 700, the NFC communication unit 201 receives the authentication ID transmitted from the MFP 600 (step S808). The NFC communication unit 201 determines whether to authenticate usage of the MFP 600 with the received authentication ID (step S809). When the NFC communication unit 201 determines to authenticate usage of the MFP 600 for the received authentication ID (Yes in step S809), the process continues. When the NFC communication unit 201 determines not to authenticate usage of the MFP 600 for the received authentication ID (No in step S809), the process ends.

In the MFP 600, when the authentication unit 103 determines to authenticate usage of the MFP 600, i.e., the received authentication ID is stored in the authentication data storage unit 109 (Yes in step S807), the usage allowability determining unit 104 acquires, from the authentication data storage unit 109, usage allowability information corresponding to the authentication ID and the function ID received from the mobile terminal device 700 (step S810). The NFC communication unit 101 transmits, to the mobile terminal device 700, the usage allowability information acquired from the authentication data storage unit 109 (step S811). The usage allowability determining unit 104 determines whether the function specified in the acquired usage allowability information can be used (step S812). When the usage allowability determining unit 104 determines that the specified function cannot be used (No in step S812), the process ends.

In the mobile terminal device 700, the NFC communication unit 201 receives the usage allowability information transmitted from the MFP 600 (step S813). The NFC communication unit 201 determines whether the function of the MFP 600 can be used based on the received usage allowability information (step S814). When the NFC communication unit 201 determines that the function of the MFP 600 can be used (Yes in step S814), the process continues. When the NFC communication unit 201 determines that the function of the MFP 600 cannot be used (No in step S814), the process ends.

In the MFP 600, when the usage allowability determining unit 104 determines that the specified function can be used (Yes in step S812), setting IDs and candidate values corresponding to the function ID are acquired from the setting candidate data storage unit 610 (step S815). The NFC communication unit 101 transmits the setting IDs and the candidate values to the mobile terminal device 700 (step S816).

In the mobile terminal device 700, the NFC communication unit 201 receives the setting IDs and the candidate values transmitted from the MFP 600 (step S817). The NFC communication unit 201 stores the received setting IDs and the candidate values in the data storage unit 203 (step S818).

Figure 9:
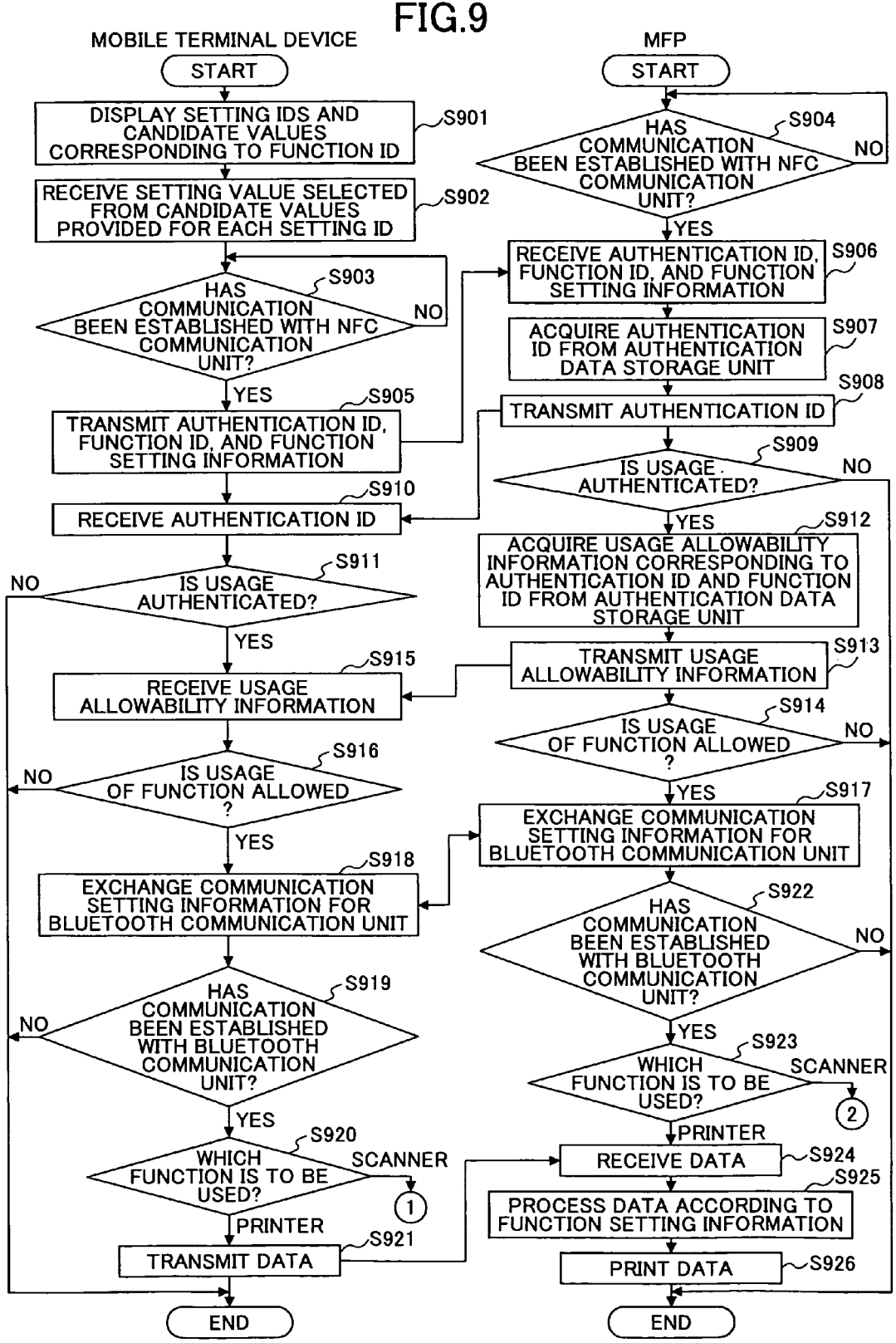
FIG. 9 is a flowchart illustrating wireless communication establishing process procedures and data processing procedures performed by the information processing system according to the second embodiment of the present invention.

Next, a description is given of establishment of wireless communication and data processing performed by the information processing system 20. FIG. 9 is a flowchart illustrating the wireless communication establishing process procedures and the data processing procedures performed by the information processing system 20. The wireless communication establishing process procedures and the data processing procedures according to the present embodiment are substantially the same as those of the flowcharts illustrated in FIGS. 3A and 3B, and therefore only the different parts are described below. Steps S903 through S926 are described with reference to FIG. 3A, and are thus not further described. Furthermore, when the function to be used is the scanner, a description is given with reference to FIG. 3B, and therefore no further descriptions are given.

First, in the MFP 700, the operation display unit 704 displays the setting IDs and candidate values corresponding to the function ID stored in the data storage unit 203 (step S901). The operation display unit 704 receives a setting value selected from among candidate values provided for each setting ID (step S902). With respect to subsequent process procedures, reference is to be made to the description for FIGS. 3A and 3B. In step S905, the selected setting value for each setting ID is transmitted to the MFP 600 as function setting information.

As described above, setting IDs and candidate values corresponding to a function ID that has been transmitted from the mobile terminal device 700 to the MFP 600, are transmitted from the MFP 600 to the mobile terminal device 700. The user selects setting values from among the transmitted candidate values for the setting IDs. Accordingly, function setting information, which corresponds to a function of the MFP 600 to be used, can be set in the mobile terminal device 700. Therefore, functions of the MFP can be used by simple operations.

(Third Embodiment)

A description is given, with reference to the accompanying drawings, of a third embodiment of the present invention. In the third embodiment, the configurations and functions of the above-described MFP and mobile terminal device are applied to a car navigation system.

Figure 10:
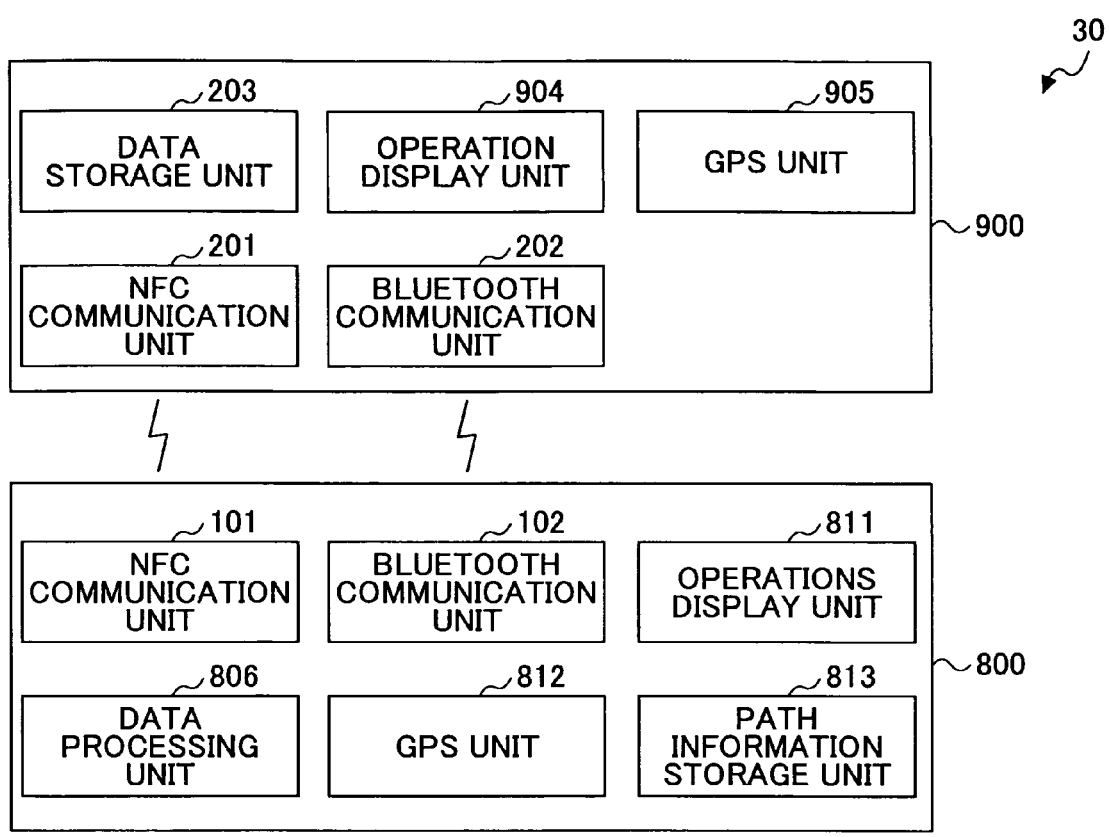
FIG. 10 is a block diagram of a car navigation system according to a third embodiment of the present invention.

A description is given of the car navigation system to which the present invention is applied, only for elements that are different from those of the first embodiment. The other elements are the same as those of the first embodiment, so reference is to be made to the above description, and no further descriptions are given. FIG. 10 is a block diagram of a car navigation system 30 according to the third embodiment.

The car navigation system 30 according to the present embodiment includes a car navigation device 800 and a mobile terminal device 900. The car navigation device 800 and the mobile terminal device 900 can communicate with each other with two communication units.

First, a description is given of the mobile terminal device 900. The mobile terminal device 900 includes the NFC communication unit 201, the Bluetooth communication unit 202, the data storage unit 203, an operations display unit 904, and a GPS (Global Positioning System) unit 905. The configurations and functions of the NFC communication unit 201, the Bluetooth communication unit 202, and the data storage unit 203 are substantially the same as those of the first embodiment, and are thus not further described.

Figure 11:
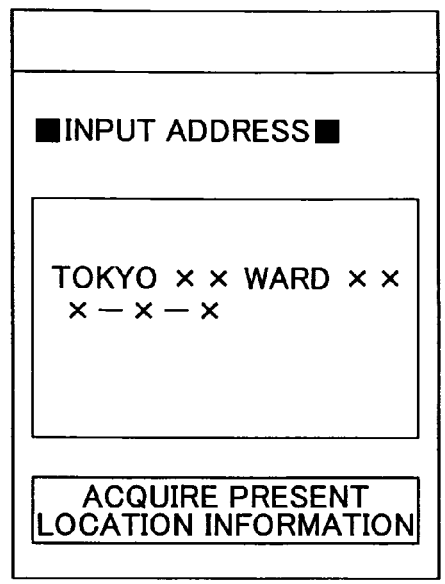
FIG. 11 illustrates an example of an input page of destination information.
Figure 12:
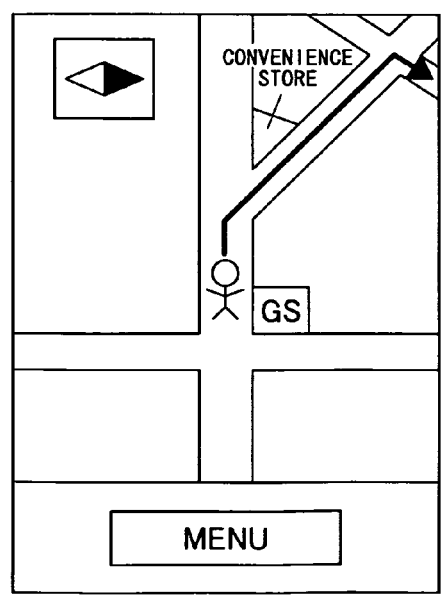
FIG. 12 illustrates an example of a display page displaying route information.

The operations display unit 904 receives input of destination information. FIG. 11 illustrates an example of an input page of destination information. As shown in FIG. 11, the operations display unit 904 receives input of the address of the destination as the destination information. Furthermore, the operations display unit 904 displays route information from the present location to the destination transmitted from the car navigation device 800. FIG. 12 illustrates an example of a display page displaying route information. Incidentally, route information includes map data necessary for displaying the route.

The GPS unit 905 identifies the present location on the globe with the use of a satellite positioning system. When a present location information acquiring button as shown in FIG. 11 is pressed, the GPS unit 905 identifies the present location of the mobile terminal device 900 on the globe.

The car navigation device 800 includes the NFC communication unit 101, the Bluetooth communication unit 102, a data processing unit 806, an operations display unit 811, a GPS unit 812, and a route information storage unit 813. The configurations and functions of the NFC communication unit 101 and the Bluetooth communication unit 102 are substantially the same as those of the first embodiment, and are thus not further described.

The data processing unit 806 searches for a route from the present location information and the destination information transmitted from the mobile terminal device 900, and acquires route information from the route information storage unit 813. The operations display unit 811 displays the route information acquired by the data processing unit 806 on the display page. The GPS unit 812 identifies the present location of the car navigation device 800 on the globe with the use of the satellite positioning system, in the same manner as that of the GPS unit 905.

The route information storage unit 813 stores route information of the region that is the target of route searching by the car navigation device 800. The route information stored in the route information storage unit 813 is data held for executing a regular navigation process performed by a typical car navigation device.

Figure 13:
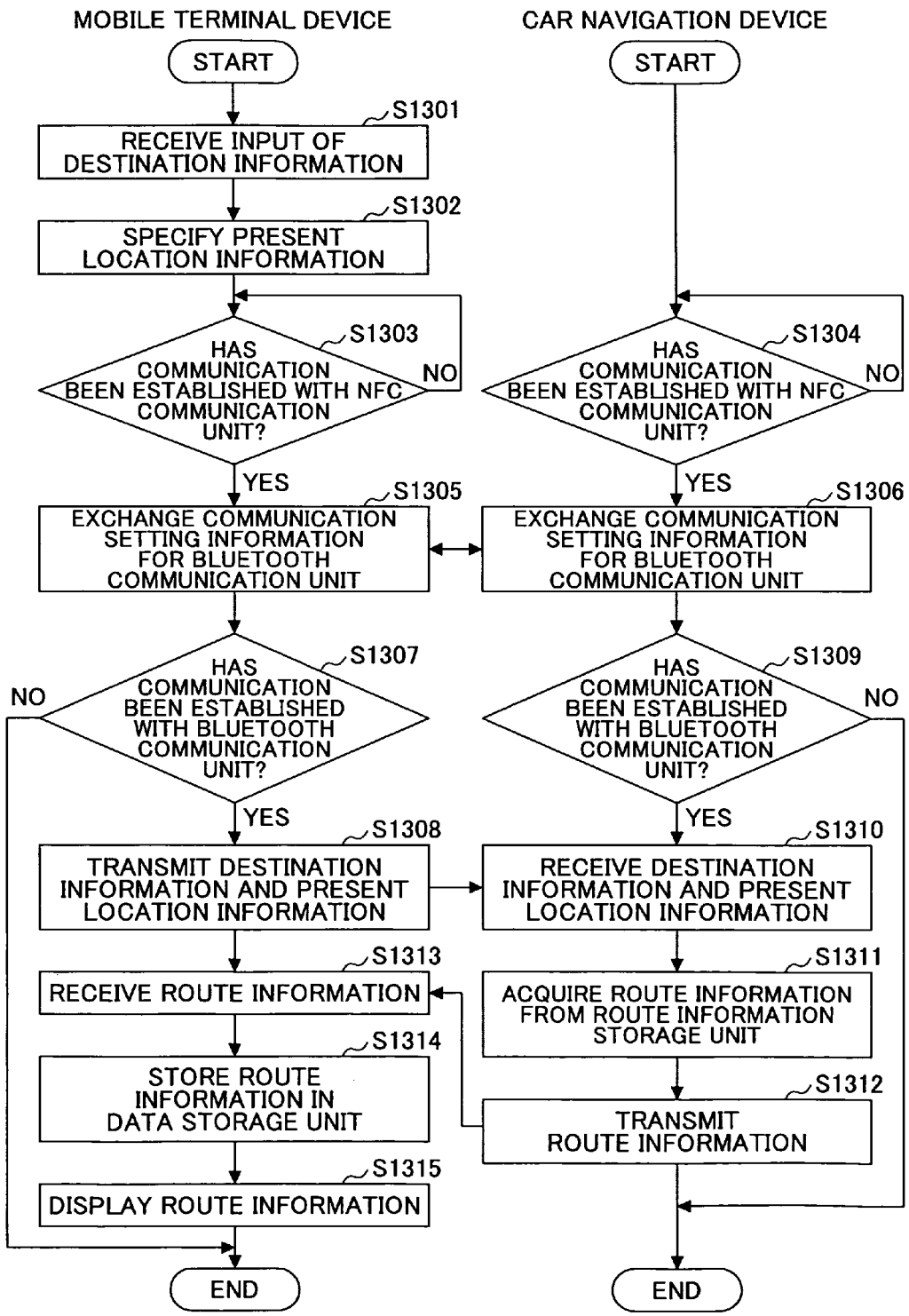
FIG. 13 is a flowchart illustrating route information display process procedures performed by the car navigation system according to the third embodiment of the present invention.

Next, a description is given of a route-information display process performed by the car navigation system 30 having the above configuration. FIG. 13 is a flowchart illustrating the route information display process procedures performed by the car navigation system 30.

First, in the mobile terminal device 900, the operations display unit 904 receives input of destination information (step S1301). The GPS unit 905 specifies present location information (step S1302). The NFC communication unit 201 determines whether communication has been established with the NFC communication unit 101 of the car navigation device 800 (step S1303). When the NFC communication unit 201 determines that communication has not been established with the NFC communication unit 101 of the car navigation device 800, i.e., the mobile terminal device 900 is not present in the communication area (No in step S1303), the process control returns to step S1303, and step S1303 is repeated until communication is established with the NFC communication unit 101 of the car navigation device 800.

Similarly, in the car navigation device 800, the NFC communication unit 101 determines whether communication has been established with the NFC communication unit 201 of the mobile terminal device 900 (step S1304). When the NFC communication unit 101 determines that communication has not been established with the NFC communication unit 201 of the mobile terminal device 900, i.e., the mobile terminal device 900 is not present in the communication area (No in step S1304), the process control returns to step S1304, and step S1304 is repeated until communication is established with the NFC communication unit 201 of the mobile terminal device 900.

In the mobile terminal device 900, when the NFC communication unit 201 determines that communication has been established with the NFC communication unit 101 of the car navigation device 800, i.e., the mobile terminal device 900 is present in the communication area (Yes in step S1303), and furthermore, in the car navigation device 800, when the NFC communication unit 101 determines that communication has been established with the NFC communication unit 201 of the mobile terminal device 900, i.e., the mobile terminal device 900 is present in the communication area (Yes in step S1304), the NFC communication unit 201 of the mobile terminal device 900 exchanges communication setting information with the NFC communication unit 101 of the car navigation device 800 (steps S1305 and S1306). In the mobile terminal device 900, the Bluetooth communication unit 202 determines whether communication has been established with the Bluetooth communication unit 102 of the car navigation device 800 (step S1307). When the Bluetooth communication unit 202 determines that communication has not been established with the Bluetooth communication unit 102 of the car navigation device 800 (No in step S1307), the process ends. When the Bluetooth communication unit 202 determines that communication has been established with the Bluetooth communication unit 102 of the car navigation device 800 (Yes in step S1307), the Bluetooth communication unit 202 transmits destination information and present location information (step S1308).

In the car navigation device 800, the Bluetooth communication unit 102 determines whether communication has been established with the Bluetooth communication unit 202 of the mobile terminal device 900 (step S1309). When the Bluetooth communication unit 102 determines that communication has not been established with the Bluetooth communication unit 202 of the mobile terminal device 900 (No in step S1309), the process ends. When the Bluetooth communication unit 102 determines that communication has been established with the Bluetooth communication unit 202 of the mobile terminal device 900 (Yes in step S1309), the Bluetooth communication unit 102 receives destination information and present location information (step S1310). The data processing unit 806 acquires, from the route information storage unit 813, route information stored in association with the received destination information and present location information (step S1311). The Bluetooth communication unit 102 transmits the acquired route information to the mobile terminal device 900 (step S1312).

In the mobile terminal device 900, the Bluetooth communication unit 202 receives the route information transmitted from the car navigation device 800 (step S1313). The Bluetooth communication unit 202 stores the received route information in the data storage unit 203 (step S1314). The operations display unit 904 displays the route information (step S1315).

As described above, destination information and present location information are transmitted from the mobile terminal device 900 to the car navigation device 800, and route information stored in the car navigation device 800 is transmitted to the mobile terminal device 900, so that the route information can be displayed on the mobile terminal device 900. Accordingly, even when a user moves away from a vehicle installed with the car navigation device 800, the user can confirm the route information with the mobile terminal device 900.

Furthermore, the mobile terminal device 900 needs to store, in the data storage unit 203, only the route information associated with the present location information and the destination information, and therefore the data capacity of the data storage unit 203 can be considerably smaller than that of the route information storage unit 813 of the car navigation device 800.

In the present embodiment, routing assistance from the present location to a destination is taken as an example; however, it is possible to provide routing assistance for a return route with the use of a navigation function provided in the operations display unit 904 of the mobile terminal device 900. Furthermore, it is also possible to input plural destinations from the mobile terminal device 900 and receive plural route information items from the car navigation device 800, to provide route assistance for each of the destinations.

(Fourth Embodiment)

A description is given, with reference to the accompanying drawings, of a fourth embodiment of the present invention. In the fourth embodiment, the configurations and functions of the above-described MFP and mobile terminal device are applied to a home appliance system.

Figure 14:
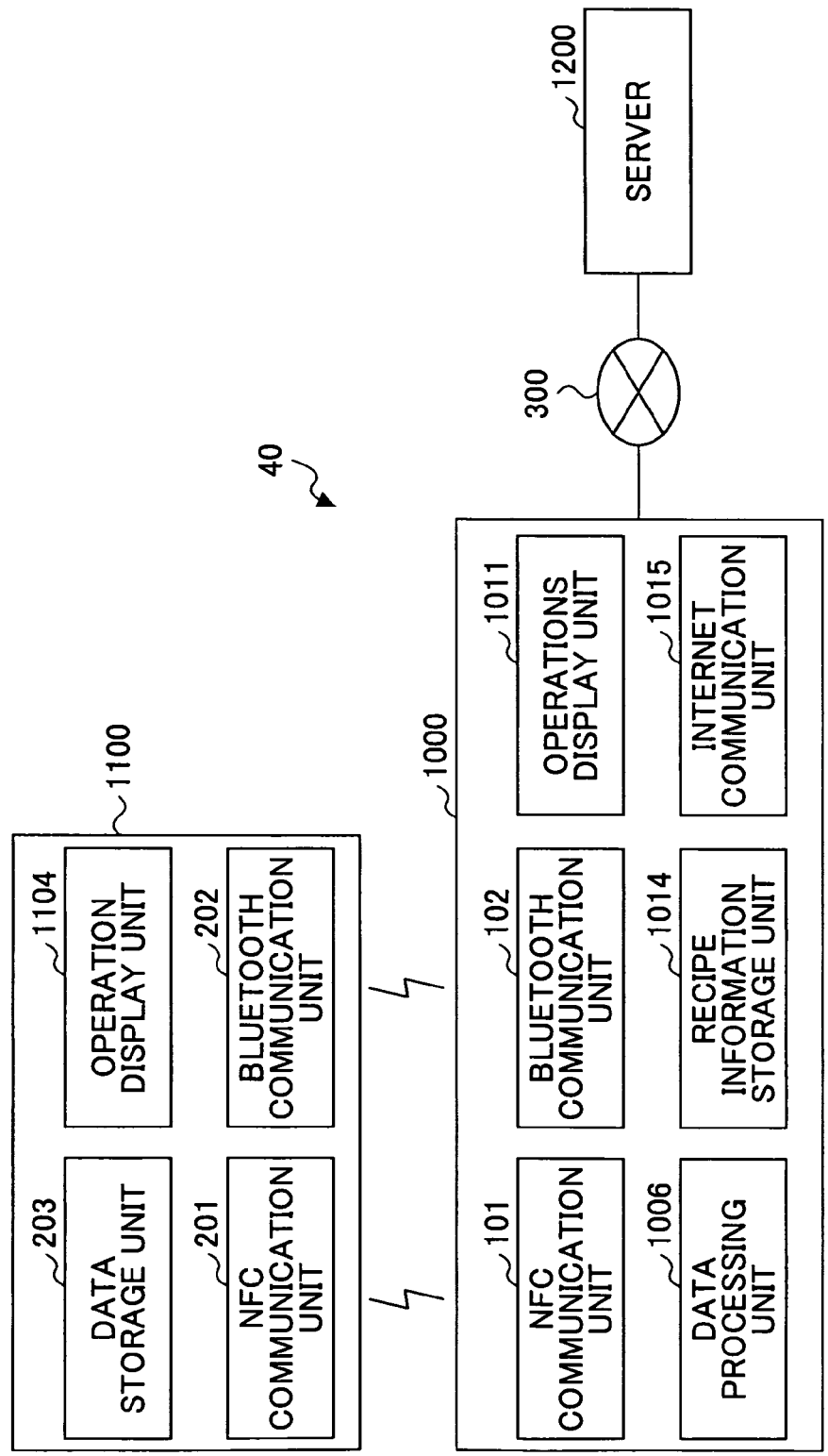
FIG. 14 is a block diagram of a home appliance system according to a fourth embodiment of the present invention.

A description is given of the home appliance system to which the present invention is applied, only for elements that are different from those of the first embodiment. The other elements are the same as those of the first embodiment, so reference is to be made to the above description, and no further descriptions are given. FIG. 14 is a block diagram of a home appliance system 40 according to the fourth embodiment.

The home appliance system 40 according to the present embodiment includes a microwave oven device 1000 and a mobile terminal device 1100. The microwave oven device 1000 and the mobile terminal device 1100 can communicate with each other with two communication units. Furthermore, the microwave oven device 1000 is connected to a server 1200 via the network 300.

First, a description is given of the mobile terminal device 1100. The mobile terminal device 1100 includes the NFC communication unit 201, the Bluetooth communication unit 202, the data storage unit 203, and an operations display unit 1104. The configurations and functions of the NFC communication unit 201, the Bluetooth communication unit 202, and the data storage unit 203 are substantially the same as those of the first embodiment, and are thus not further described.

The operations display unit 1104 displays index information including recipe names and recipe IDs transmitted from the microwave oven device 1000, and receives input of the selected recipe ID. The operations display unit 1104 displays recipe information corresponding to the recipe ID transmitted from the microwave oven device 1000.

The microwave oven device 1000 includes the NFC communication unit 101, the Bluetooth communication unit 102, a data processing unit 1006, an operations display unit 1011, a recipe information storage unit 1014, and an Internet communication unit 1015. The configurations and functions of the NFC communication unit 101 and the Bluetooth communication unit 102 are substantially the same as those of the first embodiment, and are thus not further described.

The recipe information storage unit 1014 stores information related to recipes for cooking with the microwave device 1000. FIG. 15 illustrates an example of a data configuration of the recipe information storage unit. The recipe information storage unit 1014 stores recipe names, recipe IDs, function IDs, times, and recipe data items in association with each other. For example, as shown in FIG. 15, a dish having a recipe name "A" has a recipe ID of "1", which is cooked by using a function of the microwave device 1000 having a function ID "o"; specifically, the oven is used for "600" seconds. The recipe data item indicates the procedures for cooking the dish corresponding to the recipe name "A", which recipe data item may include image data, video data, document data, and audio data. Furthermore, the function ID "m" indicates the microwave range function of the microwave. A function ID "m:o" and time "60:900" indicate that the microwave range function is to be performed for 60 seconds and the oven function is to be used for 900 seconds by the microwave device 1000.

When a function ID of "index acquisition ID" is received from the mobile terminal device 1100, the data processing unit 1006 acquires, from the recipe information storage unit 1014, index information including a recipe name and a recipe ID. Furthermore, when a recipe ID is received from the mobile terminal device 1100, the data processing unit 1006 acquires, from the recipe information storage unit 1014, a function ID, time, and a recipe data item corresponding to the recipe ID.

The operations display unit 1011 receives a selection of a recipe name, displays recipe data, receives a selection of a function of the microwave device 1000, sets the time, etc. The Internet communication unit 1015 appropriately acquires information pertaining to the recipe from the server 1200 to which it is connected via the network 300, and stores the acquired information in the recipe information storage unit 1014.

Figure 16:
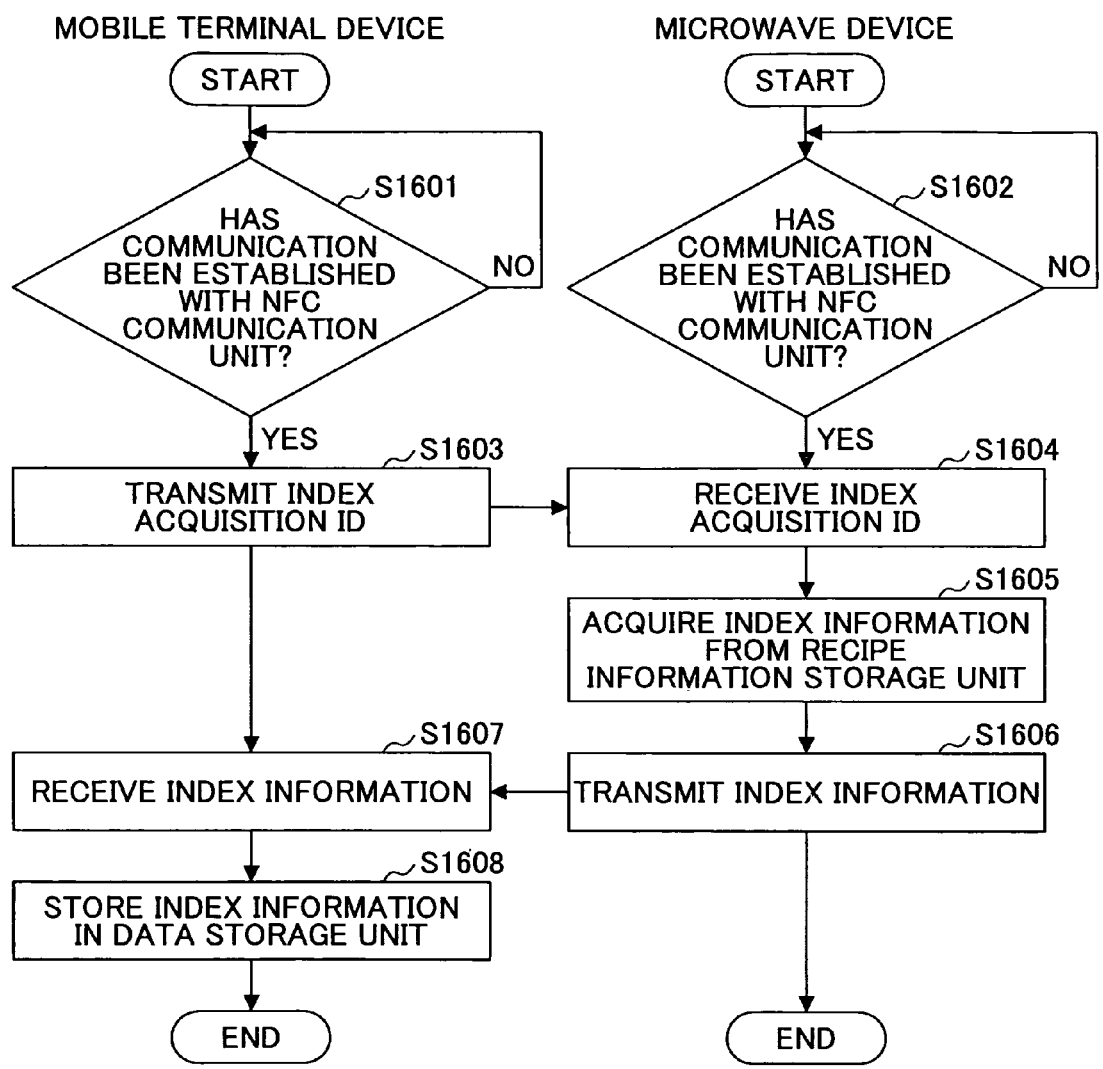
FIG. 16 is a flowchart illustrating index information acquiring process procedures performed by the home appliance system according to the fourth embodiment of the present invention.

Next, a description is given of an index information acquiring process performed by the home appliance system 40 having the above configuration. FIG. 16 is a flowchart illustrating the index information acquiring process procedures performed by the home appliance system. Index information corresponds to recipe names and recipe IDs stored in association with each other in the recipe information storage unit 1014.

First, in the mobile terminal device 1100, the NFC communication unit 201 determines whether communication has been established with the NFC communication unit 101 of the microwave device 1000 (step S1601). When the NFC communication unit 201 determines that communication has not been established with the NFC communication unit 101 of the microwave device 1000, i.e., the mobile terminal device 1100 is not present in the communication area (No in step S1601), the process control returns to step S1601, and step S1601 is repeated until communication is established with the NFC communication unit 101 of the microwave device 1000.

Similarly, in the microwave device 1000, the NFC communication unit 101 determines whether communication has been established with the NFC communication unit 201 of the mobile terminal device 1100 (step S1602). When the NFC communication unit 101 determines that communication has not been established with the NFC communication unit 201 of the mobile terminal device 1100, i.e., the mobile terminal device 1100 is not present in the communication area (No in step S1602), the process control returns to step S1602, and step S1602 is repeated until communication is established with the NFC communication unit 201 of the mobile terminal device 1100.

Next, when the NFC communication unit 201 determines that communication has been established with the NFC communication unit 101 of the microwave device 1000, i.e., the mobile terminal device 1100 is present in the communication area (Yes in step S1601), the NFC communication unit 201 transmits an index acquisition ID to the microwave device 1000 (step S1603).

In the microwave device 1000, when the NFC communication unit 101 determines that communication has been established with the NFC communication unit 201 of the mobile terminal device 1100, i.e., the mobile terminal device 1100 is present in the communication area (Yes in step S1602), the NFC communication unit 101 receives the index acquisition ID as a function ID from the mobile terminal device 1100 (step S1604). The data processing unit 1006 acquires index information from the recipe information storage unit 1014 (step S1605). The NFC communication unit 101 transmits the index information to the mobile terminal device 1100 (step S1606).

In the mobile terminal device 1100, the NFC communication unit 201 receives the index information from the microwave device 1000 (step S1607). The NFC communication unit 201 stores the received index information in the data storage unit 203 (step S1608).

Figure 17:
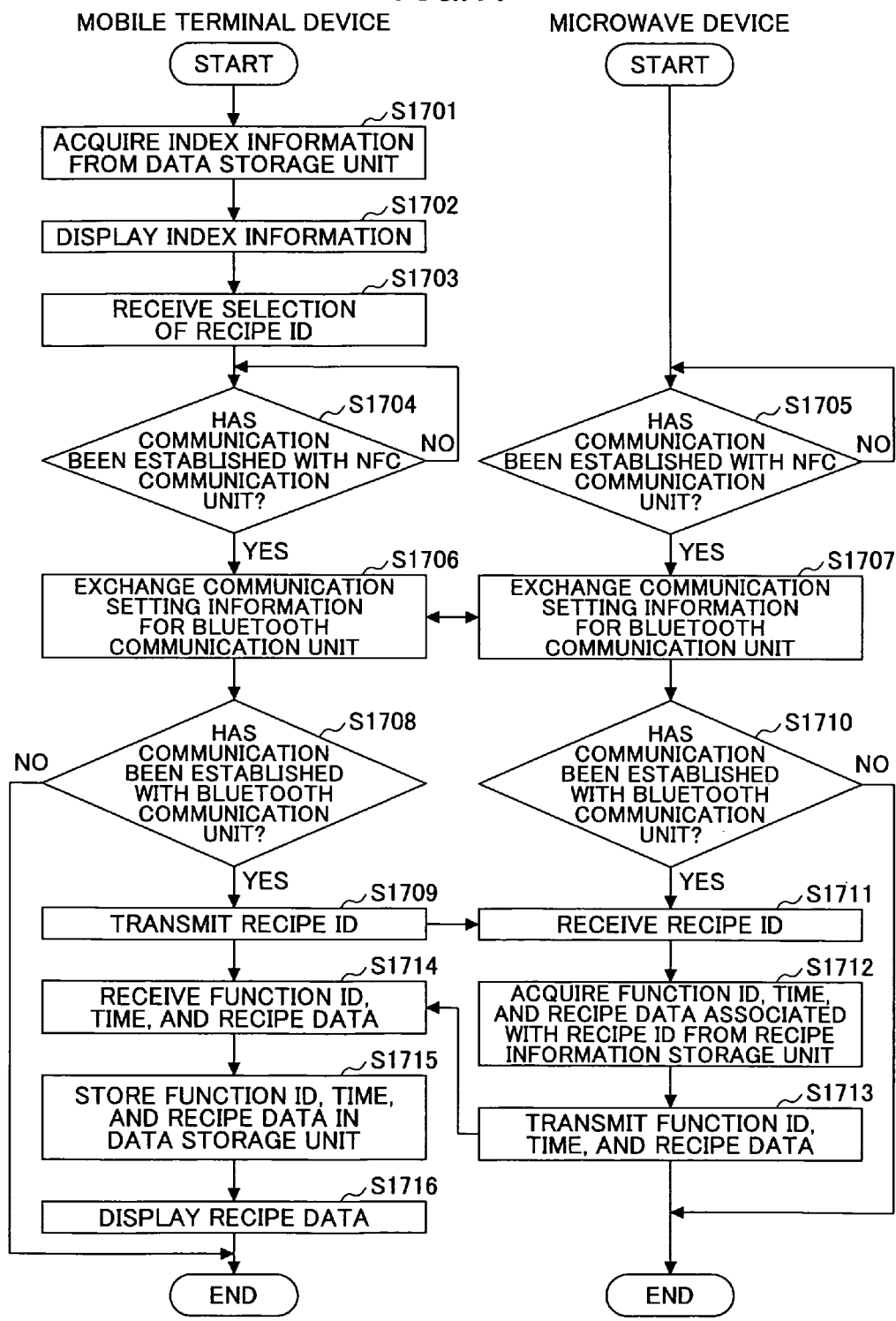
FIG. 17 is a flowchart illustrating recipe display process procedures performed by the home appliance system according to the fourth embodiment of the present invention.

Next, a description is given of a recipe display process performed by the home appliance system 40. FIG. 17 is a flowchart illustrating the recipe display process procedures performed by the home appliance system 40.

First, in the mobile terminal device 1100, the operations display unit 1104 acquires index information stored in the data storage unit 203 (step S1701), and displays the index information (step S1702). The operations display unit 1104 receives a selection of a recipe ID (step S1703). The NFC communication unit 201 determines whether communication has been established with the NFC communication unit 101 of the microwave device 1000 (step S1704). When the NFC communication unit 201 determines that communication has not been established with the NFC communication unit 101 of the microwave device 1000, i.e., the mobile terminal device 1100 is not present in the communication area (No in step S1704), the process control returns to step S1704, and step S1704 is repeated until communication is established with the NFC communication unit 101 of the microwave device 1000.

Similarly, in the microwave device 1000, the NFC communication unit 101 determines whether communication has been established with the NFC communication unit 201 of the mobile terminal device 1100 (step S1705). When the NFC communication unit 101 determines that communication has not been established with the NFC communication unit 201 of the mobile terminal device 1100, i.e., the mobile terminal device 1100 is not present in the communication area (No in step S1705), the process control returns to step S1705, and step S1705 is repeated until communication is established with the NFC communication unit 201 of the mobile terminal device 1100.

In the mobile terminal device 1100, when the NFC communication unit 201 determines that communication has been established with the NFC communication unit 101 of the microwave device 1000, i.e., the mobile terminal device 1100 is present in the communication area (Yes in step S1704), and furthermore, in the microwave device 1000, when the NFC communication unit 101 determines that communication has been established with the NFC communication unit 201 of the mobile terminal device 1100, i.e., the mobile terminal device 1100 is present in the communication area (Yes in step S1705), the NFC communication unit 201 of the mobile terminal device 1100 exchanges communication setting information with the NFC communication unit 101 of the microwave device 1000 (steps S1706 and S1707). In the mobile terminal device 1100, the Bluetooth communication unit 202 determines whether communication has been established with the Bluetooth communication unit 102 of the microwave device 1000 (step S1708). When the Bluetooth communication unit 202 determines that communication has not been established with the Bluetooth communication unit 102 of the microwave device 1000 (No in step S1708), the process ends. When the Bluetooth communication unit 202 determines that communication has been established with the Bluetooth communication unit 102 of the microwave device 1000 (Yes in step S1708), the Bluetooth communication unit 202 transmits the selected recipe ID (step S1709).

In the microwave device 1000, the Bluetooth communication unit 102 determines whether communication has been established with the Bluetooth communication unit 202 of the mobile terminal device 1100 (step S1710). When the Bluetooth communication unit 102 determines that communication has not been established with the Bluetooth communication unit 202 of the mobile terminal device 1100 (No in step S1710), the process ends. When the Bluetooth communication unit 102 determines that communication has been established with the Bluetooth communication unit 202 of the mobile terminal device 1100 (Yes in step S1710), the Bluetooth communication unit 102 receives the recipe ID (step S1711). The data processing unit 1006 acquires, from the recipe information storage unit 1014, a function ID, time, and a recipe data item associated with the recipe ID (step S1712). The Bluetooth communication unit 102 transmits the acquired function ID, time, and recipe data item to the mobile terminal device 1100 (step S1713).

In the mobile terminal device 1100, the Bluetooth communication unit 202 receives the function ID, time, and recipe data item from the microwave device 1000 (step S1714). The Bluetooth communication unit 202 stores the received function ID, time, and recipe data item in the data storage unit 203 (step S1715). The operations display unit 1104 displays the recipe data (step S1716).

As described above, recipe data can be displayed on the mobile terminal device 1100. Accordingly, even when a user is away from the microwave device 1000, the user can confirm the recipe, which improves convenience for the user. Particularly, when the user is cooking at a position where it is difficult to view the microwave device 1000, this system provides high convenience for the user.

Figure 18:
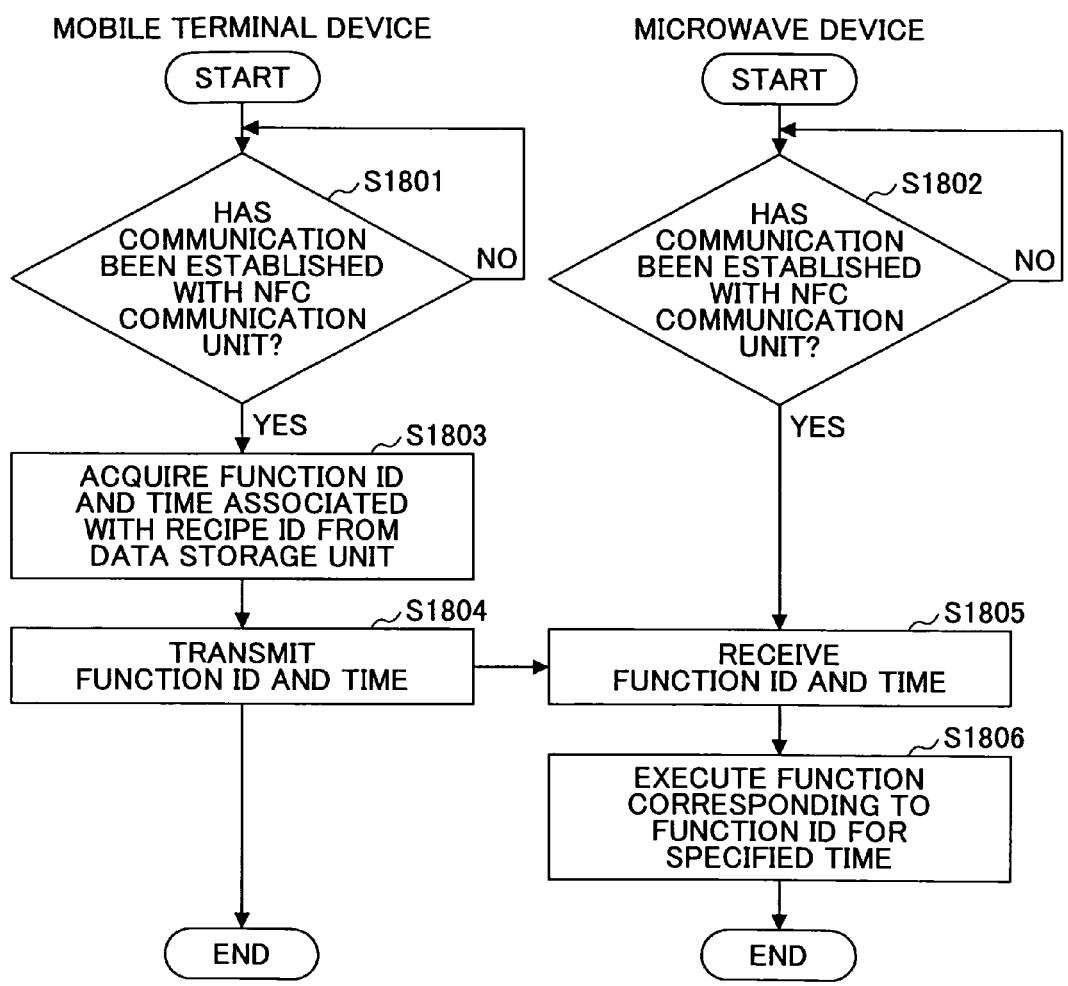
FIG. 18 is a flowchart illustrating microwave device operation process procedures performed by the home appliance system according to the fourth embodiment of the present invention.

Next, a description is given of a microwave device operation process performed by the home appliance system 40. FIG. 18 is a flowchart illustrating the microwave device operation process procedures performed by the home appliance system 40.

First, in the mobile terminal device 1100, the NFC communication unit 201 determines whether communication has been established with the NFC communication unit 101 of the microwave device 1000 (step S1801). When the NFC communication unit 201 determines that communication has not been established with the NFC communication unit 101 of the microwave device 1000, i.e., the mobile terminal device 1100 is not present in the communication area (No in step S1801), the process control returns to step S1801, and step S1801 is repeated until communication is established with the NFC communication unit 101 of the microwave device 1000.

Similarly, in the microwave device 1000, the NFC communication unit 101 determines whether communication has been established with the NFC communication unit 201 of the mobile terminal device 1100 (step S1802). When the NFC communication unit 101 determines that communication has not been established with the NFC communication unit 201 of the mobile terminal device 1100, i.e., the mobile terminal device 1100 is not present in the communication area (No in step S1802), the process control returns to step S1802, and step S1802 is repeated until communication is established with the NFC communication unit 201 of the mobile terminal device 1100.

Next, in the mobile terminal device 1100, when the NFC communication unit 201 determines that communication has been established with the NFC communication unit 101 of the microwave device 1000, i.e., the mobile terminal device 1100 is present in the communication area (Yes in step S1801), the NFC communication unit 201 acquires, from the data storage unit 203, a function ID and time associated with the recipe ID (step S1803). This recipe ID is associated with the recipe data item displayed on the operations display unit 1104. The NFC communication unit 201 transmits the acquired function ID and time to the microwave device 1000 (step S1804).

In the microwave device 1000, when the NFC communication unit 101 determines that communication has been established with the NFC communication unit 201 of the mobile terminal device 1100, i.e., the mobile terminal device 1100 is present in the communication area (Yes in step S1802), the NFC communication unit 101 receives the function ID and time from the mobile terminal device 1100 (step S1805). The data processing unit 1006 executes the function corresponding to the function ID, such as an oven function or a microwave range function, for as long as the specified time (step S1806).

As described above, settings can be made for the microwave in accordance with the recipe currently being used to cook a dish, simply by bringing the mobile terminal device 1100 near the microwave device 1000, and therefore the user's convenience is considerably improved.

In the above described embodiments, the microwave device is taken as an example; however, the present invention is not limited to a microwave device. The present invention can be applied to other home appliances to confirm information stored in the appliance from a remote location or to control the desired function from a mobile terminal device.

An aspect in accordance with the present invention provides an information processing apparatus for performing non-contact communication with a mobile terminal device, including a first communication unit corresponding to a first communication area; a second communication unit corresponding to a second communication area; and a processing unit, wherein the first communication area and the second communication area are different from one another; in the event that the mobile terminal device is present within the first communication area, the first communication unit receives from the mobile terminal device by non-contact communication, communication setting information for establishing communication between the mobile terminal device and the second communication unit, and function information indicating a function for processing substantial information including at least one of a document and an image which is to be received or transmitted by the second communication unit; the second communication unit establishes communication with the mobile terminal device based on the communication setting information received by the first communication unit, and receives from the mobile terminal device or transmits to the mobile terminal device the substantial information by non-contact communication; and the processing unit is configured to process the substantial information with the function corresponding to the function information received by the first communication unit.

Another aspect in accordance with the present invention provides the above information processing apparatus, further including an authentication information storing unit configured to store authentication information used for determining whether usage of the information processing apparatus is authorized; and an authenticating unit configured to determine whether the mobile terminal device is authorized to use the information processing apparatus by determining whether authentication information transmitted from the mobile terminal device and received by the first communication unit corresponds to the authentication information stored in the authentication information storing unit, wherein the processing unit processes the substantial information with the function, in the event that the authenticating unit determines that the mobile terminal device is authorized to use the information processing apparatus.

Another aspect in accordance with the present invention provides the above information processing apparatus, wherein the processing unit does not process the substantial information with the function, in the event that the authenticating unit determines that the mobile terminal device is not authorized to use the information processing apparatus.

Another aspect in accordance with the present invention provides the above information processing apparatus, wherein the authentication information storing unit stores, in association with the authentication information, the function information indicating the function of the information processing apparatus, and usage allowability information indicating whether usage of the function information is allowed, wherein the information processing apparatus further includes a usage allowability determining unit configured to determine whether usage of the function indicated by the function information received from the mobile terminal device is allowed, based on the usage allowability information stored in the authentication information storing unit corresponding to the authentication information and the function information that are transmitted from the mobile terminal device, wherein the processing unit processes the substantial information with the function, in the event that the usage allowability determining unit determines that usage of the function is allowed.

Another aspect in accordance with the present invention provides the above information processing apparatus, wherein the processing unit does not process the substantial information with the function, in the event that the usage allowability determining unit determines that usage of the function is not allowed.

Another aspect in accordance with the present invention provides the above information processing apparatus, wherein the first communication unit receives function setting information indicating processing contents of the function to be used for processing the substantial information; and the processing unit processes the substantial information based on the function setting information received by the first communication unit.

Another aspect in accordance with the present invention provides the above information processing apparatus, further including a setting candidate information storage unit configured to store, in association with the function information, setting candidate information corresponding to values that can be set for the processing contents of the function of the information processing apparatus, wherein the first communication unit transmits, to the mobile terminal device, the setting candidate information stored in the setting candidate information storage unit corresponding to the function information transmitted from the mobile terminal device, and receives, from the mobile terminal device, the function setting information indicating a selection of the setting candidate information.

Another aspect in accordance with the present invention provides the above information processing apparatus, wherein the first communication unit receives printing as the function information; the second communication unit receives data stored in the mobile terminal device as the substantial information; and the processing unit processes the substantial information based on the function setting information, and prints the processed substantial information with a printing unit.

Another aspect in accordance with the present invention provides the above information processing apparatus, wherein the first communication unit receives scanning as the function information; the processing unit scans an original with a scanning unit to obtain data, and processes the data based on the function setting information; and the second communication unit transmits, to the mobile terminal device, the data processed by the processing unit as the substantial information.

Another aspect in accordance with the present invention provides the above information processing apparatus, wherein the first communication unit receives copying as the function information; and the processing unit scans an original with a scanning unit to obtain data, processes the data based on the function setting information, and prints the processed data with a printing unit.

Another aspect in accordance with the present invention provides the above information processing apparatus, wherein the first communication unit receives faxing as the function information; and the processing unit processes the substantial information received from the mobile terminal device based on the function setting information, and transmits, with a transmitting unit, the processed substantial information to another information processing apparatus via a network.

Another aspect in accordance with the present invention provides the above information processing apparatus, wherein the first communication unit receives faxing as the function information; and the processing unit scans an original with a scanning unit to obtain data, processes the data based on the function setting information, and transmits, with a transmitting unit, the processed substantial information to another information processing apparatus via a network.

Another aspect in accordance with the present invention provides a route searching device for performing non-contact communication with a mobile terminal device, including a first communication unit corresponding to a first communication area; a second communication unit corresponding to a second communication area; a route information storage unit configured to store route information in association with destination information and present location information; and a processing unit, wherein the first communication area and the second communication area are different from one another; in the event that the mobile terminal device is present within the first communication area, the first communication unit receives from the mobile terminal device by non-contact communication, communication setting information for establishing communication between the mobile terminal device and the second communication unit; the second communication unit establishes communication with the mobile terminal device based on the communication setting information received by the first communication unit, and receives destination information and present location information from the mobile terminal device by non-contact communication; the processing unit searches the route information storage unit for the route information corresponding to the destination information and the present location information received by the second communication unit, and acquires the route information found as a result of the search; and the second communication unit transmits, to the mobile terminal device, the route information acquired by the processing unit.

Another aspect in accordance with the present invention provides a home appliance device for performing non-contact communication with a mobile terminal device, including a first communication unit corresponding to a first communication area; a second communication unit corresponding to a second communication area; a recipe information storage unit configured to store recipe identification information for identifying a recipe, in association with recipe information indicating information relevant to the recipe; and a processing unit, wherein the first communication area and the second communication area are different from one another; in the event that the mobile terminal device is present within the first communication area, the first communication unit receives from the mobile terminal device by non-contact communication, communication setting information for establishing communication between the mobile terminal device and the second communication unit; the second communication unit establishes communication with the mobile terminal device based on the communication setting information received by the first communication unit, and receives recipe identification information from the mobile terminal device by non-contact communication; the processing unit acquires, from the recipe information storage unit, the recipe information corresponding to the recipe identification information received by the second communication unit; and the second communication unit transmits, to the mobile terminal device, the recipe information acquired by the processing unit.

Another aspect in accordance with the present invention provides an information processing system including a mobile terminal device including a first communication unit and a second communication unit having different communication areas from one another; and an information processing apparatus including a third communication unit which uses the same communication method as that of the first communication unit, a fourth communication which uses the same communication method as that of the second communication unit, and a processing unit, wherein non-contact communication is performed between the first communication unit of the mobile terminal device and the third communication unit of the information processing apparatus; non-contact communication is performed between the second communication unit of the mobile terminal device and the fourth communication unit of the information processing apparatus; in the event that the mobile terminal device is present within a communication area of the information processing apparatus, the first communication unit of the mobile terminal device transmits, to the information processing apparatus by non-contact communication, communication setting information for establishing communication between the second communication unit and the fourth communication unit, and function information indicating a process to be performed on substantial information including at least one of a document and an image which is to be received or transmitted by the second communication unit; the second communication unit of the mobile terminal device establishes communication with the information processing apparatus and receives from the information processing apparatus or transmits to the information processing apparatus the substantial information by non-contact communication; in the event that the mobile terminal device is present within a communication area of the information processing apparatus, the third communication unit of the information processing apparatus receives, from the mobile terminal device by non-contact communication, the communication setting information and the function information; the fourth communication unit of the information processing apparatus establishes communication with the mobile terminal device based on the communication setting information received by the third communication unit, and receives from the mobile terminal device or transmits to the mobile terminal device the substantial information by non-contact communication; and the processing unit is configured to process the substantial information with the function corresponding to the function information received by the third communication unit.

Another aspect in accordance with the present invention provides a program product including instructions for a mobile terminal device configured to perform non-contact communication with an information processing apparatus, the mobile terminal device including a first communication unit and a second communication unit having different communication areas from one another, the instructions causing the mobile terminal device to perform a first communication step of transmitting, to the information processing apparatus by non-contact communication with the use of the first communication unit, communication setting information for establishing communication between the information processing apparatus and the second communication unit, and function information indicating a process to be performed on substantial information including at least one of a document and an image which is to be received or transmitted by the second communication unit, the first communication step being performed in the event that the mobile terminal device is present within a communication area of the information processing apparatus; and a second communication step of establishing communication between the information processing apparatus and the second communication unit, and transmitting the substantial information to the information processing apparatus or receiving the substantial information from the information processing apparatus by non-contact communication with the use of the second communication unit.

Note. 1 A route searching device for performing non-contact communication with a mobile terminal device, comprising:

a first communication unit corresponding to a first communication area;

a second communication unit corresponding to a second communication area;

a route information storage unit configured to store route information in association with destination information and present location information; and a processing unit, wherein:

the first communication area and the second communication area are different from one another;

in the event that the mobile terminal device is present within the first communication area, the first communication unit receives from the mobile terminal device by non-contact communication, communication setting information for establishing communication between the mobile terminal device and the second communication unit;

the second communication unit establishes communication with the mobile terminal device based on the communication setting information received by the first communication unit, and receives destination information and present location information from the mobile terminal device by non-contact communication;

the processing unit searches the route information storage unit for the route information corresponding to the destination information and the present location information received by the second communication unit, and acquires the route information found as a result of the search; and the second communication unit transmits, to the mobile terminal device, the route information acquired by the processing unit.

Note. 2 A home appliance device for performing non-contact communication with a mobile terminal device, comprising:

a first communication unit corresponding to a first communication area;

a second communication unit corresponding to a second communication area;

a recipe information storage unit configured to store recipe identification information for identifying a recipe, in association with recipe information indicating information relevant to the recipe; and a processing unit, wherein:

the first communication area and the second communication area are different from one another;

in the event that the mobile terminal device is present within the first communication area, the first communication unit receives from the mobile terminal device by non-contact communication, communication setting information for establishing communication between the mobile terminal device and the second communication unit;

the second communication unit establishes communication with the mobile terminal device based on the communication setting information received by the first communication unit, and receives recipe identification information from the mobile terminal device by non-contact communication;

the processing unit acquires, from the recipe information storage unit, the recipe information corresponding to the recipe identification information received by the second communication unit; and the second communication unit transmits, to the mobile terminal device, the recipe information acquired by the processing unit.

The present invention is not limited to the specifically disclosed embodiments, and variations and modifications may be made without departing from the scope of the present invention. Moreover, the configurations and functions described in the above embodiments can be implemented in combination.

The present application is based on Japanese Priority Patent Application No. 2007-197973, filed on Jul. 30, 2007, Japanese Priority Patent Application No. 2007-292089, filed on Nov. 9, 2007, and Japanese Priority Patent Application No. 2008-056074, filed on Mar. 6, 2008, the entire contents of which are hereby incorporated herein by reference.

What is claimed is:

1. An information processing apparatus for performing wireless communication with a mobile terminal device, the information processing apparatus including a plurality of associated functions, the information processing apparatus comprising:

a first communication unit corresponding to a first communication area;

a second communication unit corresponding to a second communication area; and a processing unit, wherein:

the first communication area and the second communication area are different from one another;

in the event that the mobile terminal device is present within the first communication area, the first communication unit receives from the mobile terminal device by wireless communication, communication setting information for establishing communication between the mobile terminal device and the second communication unit, and first information indicating a function for processing second information including at least one of a document and an image which is to be received or transmitted by the second communication unit, the function indicated by the first information being one of the plurality of associated functions; and the second communication unit establishes communication with the mobile terminal device based on the communication setting information received by the first communication unit, and receives from the mobile terminal device or transmits to the mobile terminal device the second information by wireless communication;

the processing unit is configured to process the second information based on the function indicated by the first information, the second information having been input from an input source corresponding to the function indicated by the first information; and the plurality of associated functions includes two or more functions among a copy function, a facsimile function, a print function, and a scanner function.

2. The information processing apparatus according to claim 1, further comprising:

an authentication information storing unit configured to store authentication information used for determining whether usage of the information processing apparatus is authorized; and an authenticating unit configured to determine whether the mobile terminal device is authorized to use the information processing apparatus by determining whether authentication information transmitted from the mobile terminal device and received by the first communication unit corresponds to the authentication information stored in the authentication information storing unit, wherein:

the processing unit processes the second information with the function, in the event that the authenticating unit determines that the mobile terminal device is authorized to use the information processing apparatus.

3. The information processing apparatus according to claim 2, wherein:

the processing unit does not process the second information with the function, in the event that the authenticating unit determines that the mobile terminal device is not authorized to use the information processing apparatus.

4. The information processing apparatus according to claim 2, wherein:

the authentication information storing unit stores, in association with the authentication information, the first information indicating the function of the information processing apparatus, and usage allowability information indicating whether usage of the first information is allowed, wherein the information processing apparatus further comprises:

a usage allowability determining unit configured to determine whether usage of the function indicated by the first information received from the mobile terminal device is allowed, based on the usage allowability information stored in the authentication information storing unit corresponding to the authentication information and the first information that are transmitted from the mobile terminal device, wherein:

the processing unit processes the second information with the function, in the event that the usage allowability determining unit determines that usage of the function is allowed.

5. The information processing apparatus according to claim 4, wherein:

the processing unit does not process the second information with the function, in the event that the usage allowability determining unit determines that usage of the function is not allowed.

6. The information processing apparatus according to claim 1, wherein:

the first communication unit receives function setting information indicating processing contents of the function to be used for processing the second information; and the processing unit processes the second information based on the function setting information received by the first communication unit.

7. The information processing apparatus according to claim 6, further comprising:

a setting candidate information storage unit configured to store, in association with the first information, setting candidate information corresponding to values that can be set for the processing contents of the function of the information processing apparatus, wherein:

the first communication unit transmits, to the mobile terminal device, the setting candidate information stored in the setting candidate information storage unit corresponding to the first information transmitted from the mobile terminal device, and receives, from the mobile terminal device, the function setting information indicating a selection of the setting candidate information.

8. The information processing apparatus according to claim 6, wherein:

the first communication unit receives printing as the first information;

the second communication unit receives data stored in the mobile terminal device as the second information; and the processing unit processes the second information based on the function setting information, and prints the processed second information with a printing unit.

9. The information processing apparatus according to claim 6, wherein:

the first communication unit receives scanning as the first information;

the processing unit scans an original with a scanning unit to obtain data, and processes the data based on the function setting information; and the second communication unit transmits, to the mobile terminal device, the data processed by the processing unit as the second information.

10. The information processing apparatus according to claim 6, wherein:

the first communication unit receives copying as the first information; and the processing unit scans an original with a scanning unit to obtain data, processes the data based on the function setting information, and prints the processed data with a printing unit.

11. The information processing apparatus according to claim 6, wherein:

the first communication unit receives faxing as the first information; and the processing unit processes the second information received from the mobile terminal device based on the function setting information, and transmits, with a transmitting unit, the processed second information to another information processing apparatus via a network.

12. The information processing apparatus according to claim 6, wherein:

the first communication unit receives faxing as the first information; and the processing unit scans an original with a scanning unit to obtain data, processes the data based on the function setting information, and transmits, with a transmitting unit, the processed second information to another information processing apparatus via a network.

13. An information processing system comprising:

a mobile terminal device comprising a first communication unit and a second communication unit having different communication areas from one another; and an information processing apparatus including a third communication unit which uses the same communication method as that of the first communication unit, a fourth communication which uses the same communication method as that of the second communication unit, and a processing unit, wherein wireless communication is performed between the first communication unit of the mobile terminal device and the third communication unit of the information processing apparatus and the information processing apparatus includes a plurality of associated functions, the plurality of associated functions including at least two or more functions among a copy function, a facsimile function, a print function, and a scanner function;

wireless communication is performed between the second communication unit of the mobile terminal device and the fourth communication unit of the information processing apparatus;

in the event that the mobile terminal device is present within a communication area of the information processing apparatus, the first communication unit of the mobile terminal device transmits, to the information processing apparatus by wireless communication, communication setting information for establishing communication between the second communication unit and the fourth communication unit, and first information indicating a process to be performed on second information including at least one of a document and an image which is to be received or transmitted by the second communication unit, the function indicated by the first information being one of the plurality of associated functions;

the second communication unit of the mobile terminal device establishes communication with the information processing apparatus and receives from the information processing apparatus or transmits to the information processing apparatus the second information by wireless communication;

in the event that the mobile terminal device is present within a communication area of the information processing apparatus, the third communication unit of the information processing apparatus receives, from the mobile terminal device by wireless communication, the communication setting information and the first information;

the fourth communication unit of the information processing apparatus establishes communication with the mobile terminal device based on the communication setting information received by the third communication unit, and receives from the mobile terminal device or transmits to the mobile terminal device the second information by wireless communication; and the processing unit is configured to process the second information based on the function indicated by the first information, the second information having been input from an input source corresponding to the function indicated by the first information.

* * * * *

UNITED STATES PATENT AND TRADEMARK OFFICE
CERTIFICATE OF CORRECTION

| | | |
|---|---|---|
| PATENT NO. | : 8,406,253 B2 | Page 1 of 1 |
| APPLICATION NO. | : 12/219869 | |
| DATED | : March 26, 2013 | |
| INVENTOR(S) | : Kato et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 919 days.

Signed and Sealed this
Thirtieth Day of December, 2014

Michelle K. Lee
*Deputy Director of the United States Patent and Trademark Office*